United States Patent
Wang et al.

(10) Patent No.: US 8,917,782 B2
(45) Date of Patent: Dec. 23, 2014

(54) VEHICULAR POWER LINE COMMUNICATION SYSTEM

(71) Applicant: DENSO CORPORATION, Kariya (JP)

(72) Inventors: Fan Wang, Nagoya (JP); Yuukou Murase, Nagoya (JP); Yoshie Sugiura, Nagoya (JP); Akira Takaoka, Okazaki (JP)

(73) Assignee: DENSO CORPORATION, Kariya (JP)

(*) Notice: Subject to any disclaimer, the term of this patent is extended or adjusted under 35 U.S.C. 154(b) by 66 days.

(21) Appl. No.: 13/761,266

(22) Filed: Feb. 7, 2013

(65) Prior Publication Data
US 2013/0208775 A1    Aug. 15, 2013

(30) Foreign Application Priority Data
Feb. 10, 2012    (JP) .................................. 2012-27142

(51) Int. Cl.
*H04B 3/00* (2006.01)
*H04B 3/46* (2006.01)
*H04B 3/54* (2006.01)
*H04B 3/56* (2006.01)

(52) U.S. Cl.
CPC .. *H04B 3/46* (2013.01); *H04B 3/54* (2013.01); *H04B 3/56* (2013.01)
USPC ........................................................ 375/257

(58) Field of Classification Search
CPC ........ G05B 11/01; G08C 19/12; G08C 19/16; G06F 7/00; H04B 1/00; H04B 3/28; H04B 3/46; H04B 3/54; H04B 3/548; H04B 3/56; H04B 3/57; H04B 3/58; H04B 5/00; H02J 7/00; H02J 17/00; H04J 11/00; H04M 11/04; H04L 12/40; H04L 27/00
USPC .................. 320/109, 137; 333/12; 340/12.32, 340/13.23, 310.01, 310.02, 310.07, 310.11, 340/310.15, 415.1, 425.5, 538; 370/208, 370/210, 344, 437, 480; 375/219, 222, 224, 375/257–260, 295; 701/1, 2, 49
See application file for complete search history.

(56) References Cited

U.S. PATENT DOCUMENTS 5,148,144 A * 9/1992 Sutterlin et al. ............... 455/402
6,005,475 A * 12/1999 Takasan et al. ................ 375/258
(Continued)

FOREIGN PATENT DOCUMENTS

| JP | H02-299328 A | 12/1990 |
| JP | 2005-45327 A | 2/2005 |

(Continued)

OTHER PUBLICATIONS

Office Action mailed Feb. 18, 2014 issued in corresponding JP patent application No. 2012-27142 (and English translation).

*Primary Examiner* — Jaison Joseph
*Assistant Examiner* — Shawkat M Ali
(74) *Attorney, Agent, or Firm* — Posz Law Group, PLLC

(57) ABSTRACT

A vehicular power line communication system includes a master and a slave. The master uses a pair of twisted wires, whose far ends are connected to each other to be loop-shaped, as a power line and a communication line. The master thereby outputs high-frequency signals via the pair of twisted wires, transmitting an electric power and data modulation signals. The slave includes an aperture antenna being loop-shaped to receive data modulation signals using an electromagnetic induction connection in an electromagnetic field generated in the pair of twisted wires in response to an energization current of the pair of twisted wires. The slave further includes an error rate monitor circuit which monitors an error rate of data which are obtained from demodulation of the data modulation signals received via the aperture antenna.

11 Claims, 20 Drawing Sheets

(56) References Cited

U.S. PATENT DOCUMENTS

| | | | |
|---|---|---|---|
| 8,353,903 B2* | 1/2013 | Podhajsky | 606/33 |
| 2001/0008391 A1 | 7/2001 | Yuasa | |
| 2001/0028678 A1 | 10/2001 | Kato et al. | |
| 2006/0233279 A1* | 10/2006 | Ryder et al. | 375/296 |
| 2008/0298226 A1 | 12/2008 | Mizutani | |
| 2008/0310492 A1* | 12/2008 | Kasai et al. | 375/232 |

FOREIGN PATENT DOCUMENTS

| | | |
|---|---|---|
| JP | 2005-303632 A | 10/2005 |
| JP | 2006-148571 A | 6/2006 |
| JP | 2006-352849 A | 12/2006 |
| JP | 2008-17185 A | 1/2008 |
| JP | 2008-187465 A | 8/2008 |
| WO | 2004/054179 A1 | 6/2004 |
| WO | 2013/011686 A1 | 1/2013 |

* cited by examiner

FIG. 2
TRANSMIT-SIDE
(a) ·DATA ·POWER ⇒ 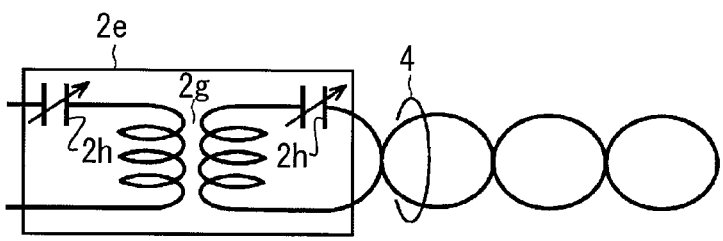
(b) ·DATA ·POWER ⇒ 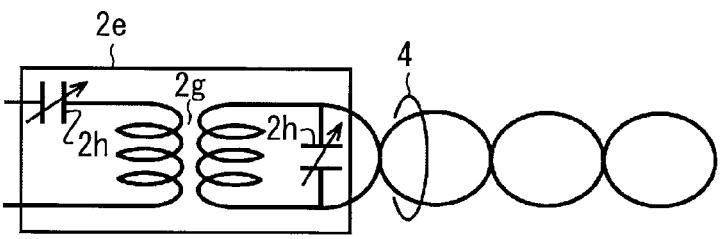
(c) ·DATA ·POWER ⇒ 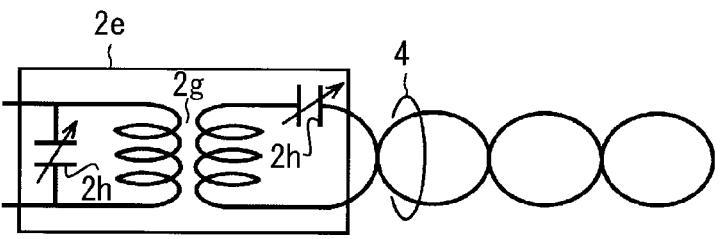
(d) ·DATA ·POWER ⇒ 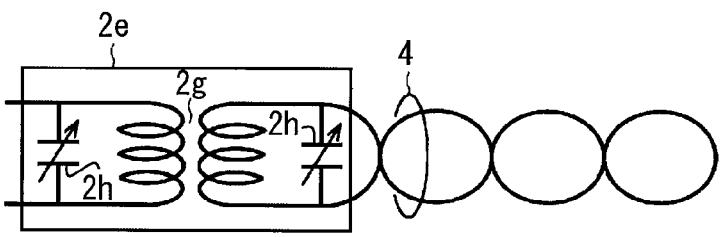
RECEIVE-SIDE
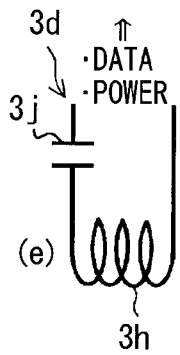 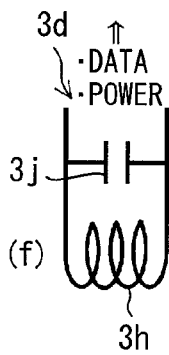 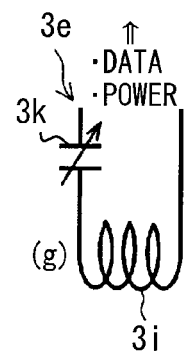 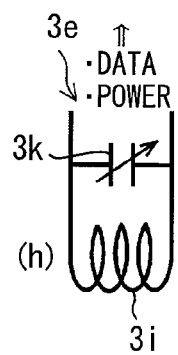

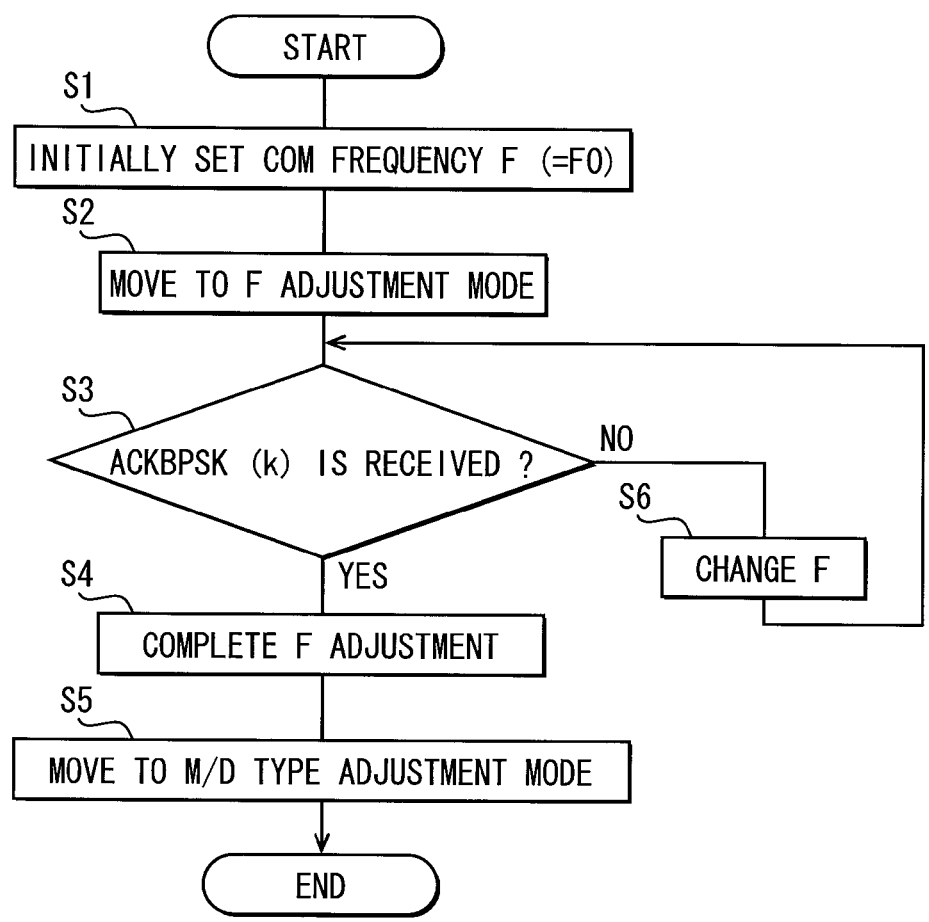

VEHICULAR POWER LINE COMMUNICATION SYSTEM

CROSS REFERENCE TO RELATED APPLICATION

This application is based on Japanese Patent Application No. 2012-27142 filed on Feb. 10, 2012, the contents of which are incorporated herein by reference.

FIELD

The present disclosure relates to a vehicular power line communication system where communicators communicate using power lines.

BACKGROUND

There are known ECUs (Electronic Control Units) in a vehicle to communicate with each other to thereby perform various controls in the vehicle smoothly. Therefore, the introduction of the power line communication (PLC) system is considered. This power line communication system is a technology which superimposes signals on high frequency carriers to thereby transmit and communicate.

For instance, Patent Literature 1 describes a technology where a moving object is equipped with a balanced feeder line composed of two parallel wire lines. The balanced feeder line is in proximity of a coupler shaped of a loop. Thereby, the moving object and the balanced feeder line form an electromagnetic induction connection (i.e., coupling) therebetween.

[Patent Literature 1] JP-A-2005-45327

The inventors find the following. The above known technology enables electromagnetic induction connection and transmission of electric power and signals; however, there is much leakage flux in other than connection portions which transmit and receive the electric power and the signals. In addition, when a system environment changes, a communication quality may deteriorate to make it difficult to maintain high speed communication.

SUMMARY

It is an object of the present disclosure to provide a vehicular power line communication system which strengthens an electromagnetic induction connection using a power line between a transmission side and a reception side to provide a high-quality and high-speed power line communication in response to a system environment.

According to an aspect of the present disclosure, a vehicular power line communication system includes a master and a slave. The master includes a pair of twisted wires. The ends of the pair of twisted wires are connected to form a loop shape. The pair of twisted wires serves as a power line and a data communication line. The master further includes a modulation portion which modulates data to prepare a data modulation signal. The master outputs a high-frequency signal via the pair of twisted wires to transmit an electric power as well as the data modulation signal. The slave includes an aperture antenna having a loop shape to receive a data modulation signal via the pair of twisted wires using an electromagnetic induction connection with an electromagnetic field generated in the pair of twisted wires according to an energization current of the pair of twisted wires. The aperture antenna has a slave-side opening area that faces a master-side opening area provided in between twisted portions in the pair of twisted wires. The slave further includes a demodulation portion which demodulates the data modulation signal received via the aperture antenna to obtain a demodulated data. The slave further includes an error rate monitor portion which monitors an error rate of the demodulated data obtained by the demodulation portion.

The aperture antenna of the slave has the opening area that faces the opening area provided in between twisted portions included in the pair of twisted wires. Therefore, the power line communication may be achieved by strengthening an electromagnetic induction connection. Further, the use of the pair of twisted wires decreases leakage magnetic flux. In addition, the slave includes the demodulation portion which demodulates data modulation signals via the aperture antenna, and the error rate monitor portion which monitors the error rate of the demodulated data that is obtained by the demodulation by the demodulation portion. The measurement result of the error rate may be reflected on the communication process. This achieves a high-speed modulation and demodulation type within a range of error rates accepted by the system and provides a high-quality and high-speed power line communication in response to an environment of the system.

BRIEF DESCRIPTION OF THE DRAWINGS

The above and other objects, features and advantages of the present disclosure will become more apparent from the following detailed description made with reference to the accompanying drawings. In the drawings:

FIG. 2 show electric block diagrams illustrating examples of a matching circuit;

FIG. 7 is a flowchart diagram illustrating a process by a master in a communication frequency adjustment mode;

DETAILED DESCRIPTION

First Embodiment

Figure 1:
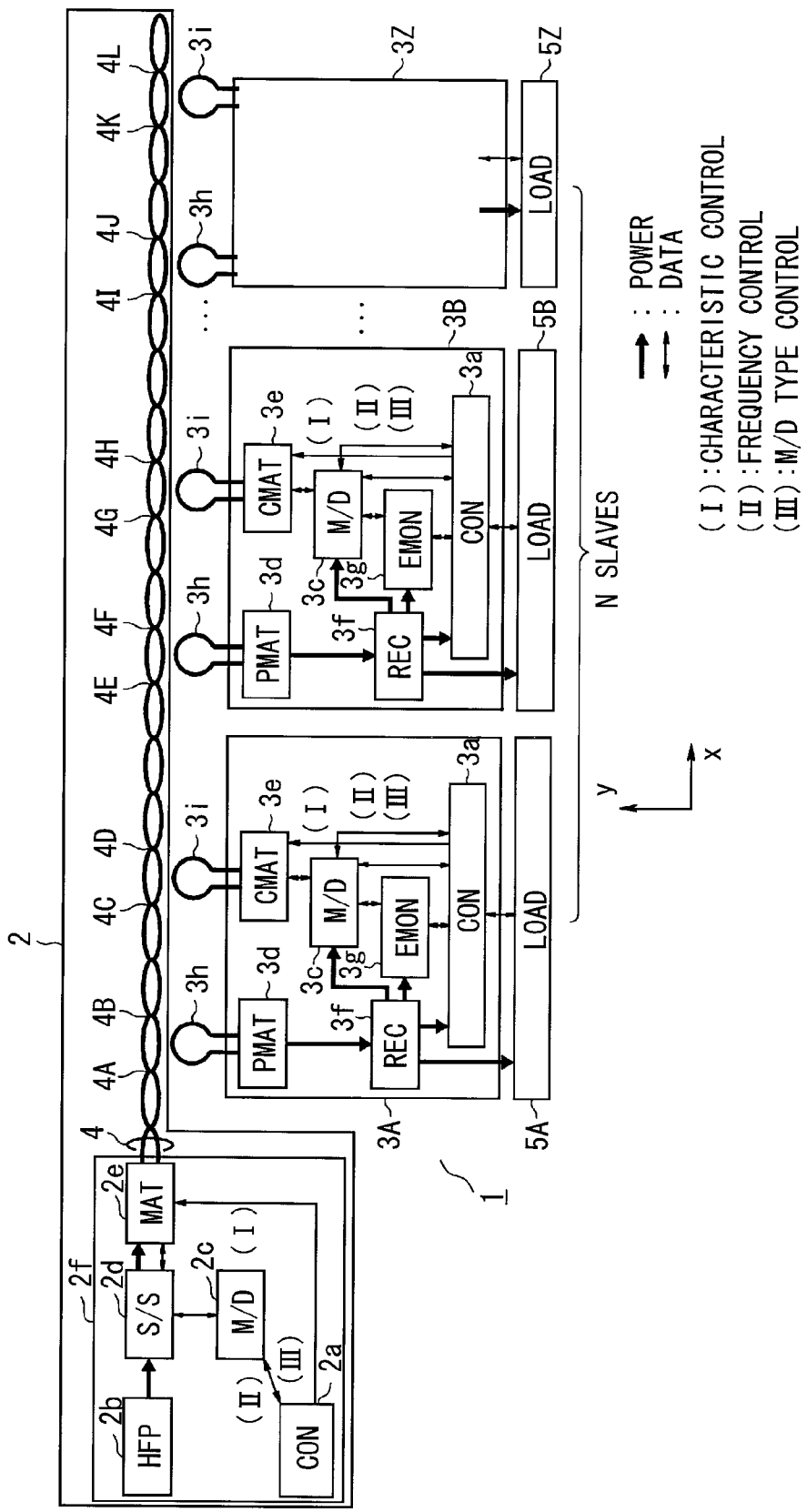
FIG. 1 is an electric block diagram schematically illustrating a vehicular power line communication system mounted in a vehicle according to a first embodiment of the present disclosure.

The following explains a first embodiment of the present disclosure with reference to FIGS. 1 to 13. A vehicular power line communication system 1 includes a master (master-side system) 2 and slaves (slave-side systems) 3A to 3Z. The master 2 is connected with a battery (not shown). This master 2 supplies electric power to several slaves 3A to 3Z via the power line based on electric power of the battery. The several slaves 3A to 3Z operate based on the supplied electric power. The slaves 3A to 3Z are connected with loads 5A to 5Z that are composed of sensors and actuators, respectively. Hereinafter, each of the several slaves 3A to 3Z may be referred to as a slave 3A to 3Z.

The master 2 contains a communicator main body (master main body) 2f and a pair of twisted wires 4, which is connected with the communicator main body 2f. The communicator main body 2f includes a control circuit (a modulation frequency control portion, a modulation and demodulation type control portion) 2a which controls communications and other functions; a high-frequency power generation circuit 2b; a modulation and demodulator circuit (also referred to as a modem circuit or a modulation portion) 2c; a superimposition and separation circuit 2d; and a matching circuit (matching portion) 2e. The control circuit 2a mainly includes a microcomputer. The high-frequency power generation circuit 2b generates high-frequency signals (carrier wave signals) having a predetermined frequency, and outputs the generated high-frequency signals to the superimposition and separation circuit 2d as power signals.

The modulation and demodulation circuit 2c changes communication frequencies or modulation and demodulation types according to controls of the control circuit 2a. The modulation and demodulation circuit 2c modulates communication data of the master 2 to prepare modulated data and outputs the modulated data to the superimposition and separation circuit 2d as data modulation signals. The superimposition and separation circuit 2d mixes the carrier wave signals and data modulation signals and outputs the mixed data to the matching circuit 2e. The matching circuit 2e transmits, to the pair of twisted wires 4, power and data modulation signals, i.e., high-frequency signals that are the carrier wave signals on which the data modulation signals are superimposed.

The control circuit 2a connects a control line to the matching circuit 2e, thereby adjusting an impedance match status of the matching circuit 2e. In addition, the control circuit 2a connects a control line to the modulation and demodulation circuit 2c, thereby controlling a data modulation and demodulation type and data communication frequency of the modulation and demodulation circuit 2c and functioning as a communication frequency control portion and a data modulation and demodulation control portion.

With reference to (a) to (d) in FIG. 2, the following will explain examples of configurations of the matching circuit 2e. The matching circuit 2e includes a transformer 2g and a variable capacity capacitor 2h, which is connected to a primary side and/or a secondary side of the transformer 2g in series or in parallel. The matching circuit 2e may have any circuit configuration as long as providing an impedance match.

Figure 3:
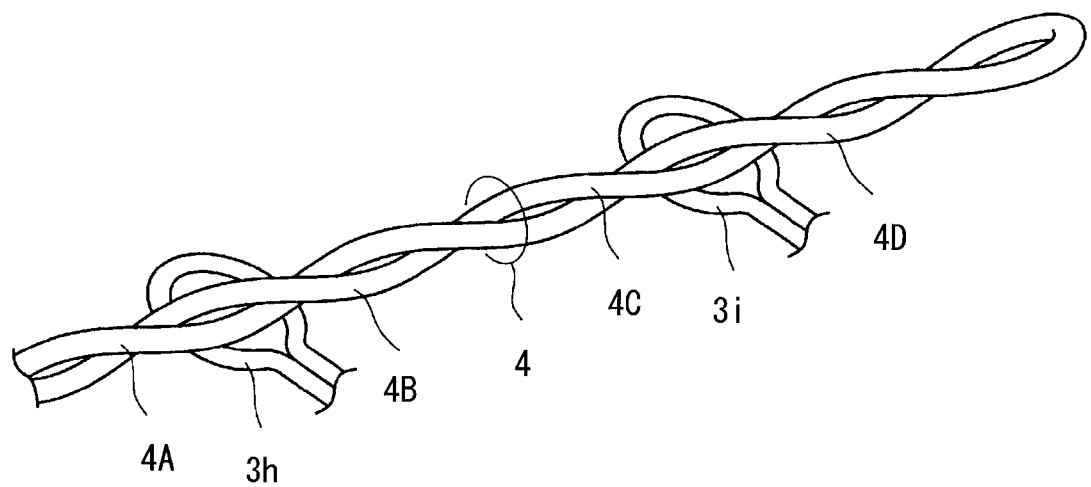
FIG. 3 is a perspective view illustrating a configuration of a pair of twisted wires with far ends of the twisted wires connected to be loop-shaped.

FIG. 3 illustrates a perspective view of a pair of twisted wires 4. The twisted wires 4 are extended from an output terminal of the main body 2f installed in the vehicle to a farthest end by about one meter. As illustrated in FIGS. 1, 3, the pair of twisted wires 4 has a loop shape in which the farthest ends of the twisted wires (i.e., core wires) are connected or combined. In the present embodiment, the communication line composed of the twist wires having a special shape of the farthest ends combined is referred to as a pair of twisted wires 4 or the twisted wires 4.

With reference to FIG. 1, the slave 3A to 3Z (namely, each slave) contains a control circuit 3a, a modulation and demodulation circuit (demodulation portion) 3c, a power-supply matching circuit 3d, a communication matching circuit (matching portion) 3e, a rectification circuit 3f, and an error rate monitor circuit 3g (error rate monitor portion). The power-supply matching circuit 3d is connected with an aperture antenna 3h for electric power reception; the communication matching circuit 3e is connected with an aperture antenna 3i for data reception.

The aperture antennas 3h and 3i have a loop shape such as a circle, and receive an electromagnetic field generated in the above-mentioned twisted wires 4 via an electromagnetic induction connection. Therefore, the slaves 3A, . . . 3Z receive via the aperture antennas 3h and 3i, the electric power and the data modulation signals which the main body 2f of the master 2 transmits, respectively.

With reference to (e) to (f) in FIG. 2, the following will explain examples of an equivalent circuit of the power-supply matching circuit 3d in the reception side. The power-supply matching circuit 3d is a matching circuit which connects a fixed capacity capacitor 3j to the aperture antenna 3h in parallel or in series, and matches a transmission frequency band (for example, 10.7 MHz band) of power signals having high frequencies.

With reference to (g) to (h) in FIG. 2, the following will explain examples of an equivalent circuit of the communication matching circuit 3e in the reception side. The communication matching circuit 3e is a matching circuit which connects a variable capacity capacitor 3k to the aperture antenna 3i in parallel or in series. The communication matching circuit 3e changes a capacity value of the variable capacity capacitor 3k depending on control of the control circuit 3a, and provides an impedance matching to a predetermined frequency band (several tens of MHz band) higher than the above-mentioned frequency power supply band.

Figure 4:
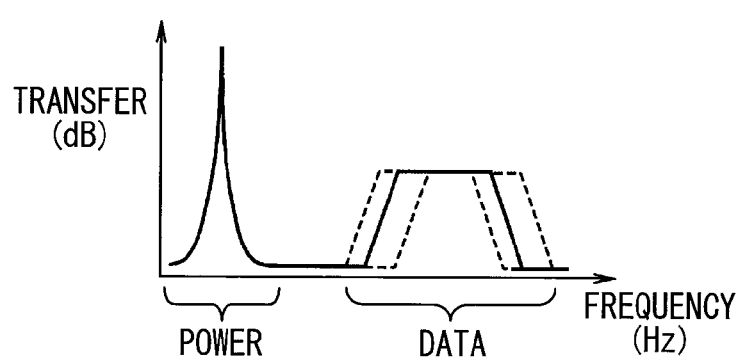
FIG. 4 is a frequency characteristic diagram illustrating frequency dependency of power signals and data signals which are superimposed on twisted wires.
Figure 5A:
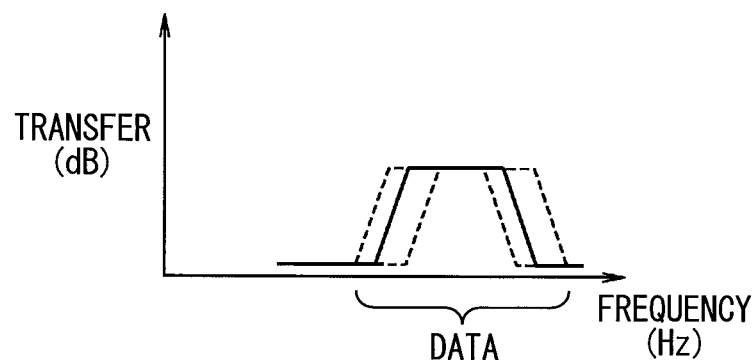
FIG. 5A is a carrier characteristic diagram for data communication.
Figure 5B:
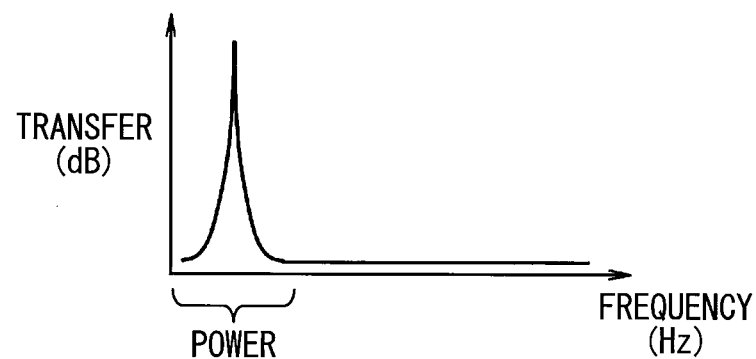
FIG. 5B is a carrier characteristic diagram for power supply.

FIG. 4 illustrates transfer characteristics of the matching circuit 2e in the master 2. FIG. 5A and FIG. 5B illustrate transfer characteristics of the communication matching circuit 3e and the power-supply matching circuit 3d of the slaves 3A, . . . 3Z, respectively. The frequency band for power supply (for example, 10.7 MHz band) and the frequency band for data communications (tens of MHz band) are separate from each other. This may provide the matching circuit 2e, the power-supply matching circuit 3d, and the communication matching circuit 3e with suitable frequency bands and suitable transfer characteristics. In the present embodiment, the bit rate of the data communication is comparatively high; therefore, the frequency band of the data communication is provided to be higher than the frequency band for power supply (10.7 MHz band). However, if the bit rate is low, the frequency band for data communications may be provided to be lower than the frequency band for power supply.

Returning to FIG. 1, upon receiving high-frequency signals for power supply, the power-supply matching circuit 3d outputs them to the rectification circuit 3f. The rectification circuit 3f rectifies the electric power AC signals to form direct current power. The direct current power is supplied to the modulation and demodulation circuit 3c, the error rate monitor circuit 3g, the control circuit 3a, and the load 5A.

The modulation and demodulation circuit 3c operates on direct current power supplied from the rectification circuit 3f. The modulation and demodulation circuit 3c receives a data modulation signal via the aperture antenna 3i, which is matched with a predetermined frequency band for data communication by the communication matching circuit 3e. The modulation and demodulation circuit 3c demodulates the data modulation signal to obtain a demodulated data using the communication frequency and the modulation and demodulation type which are controlled by the control circuit 3a, and outputs the demodulated data to the error rate monitor circuit 3g. The control circuit 3a controls the communication frequency and the modulation and demodulation type of the modulation and demodulation circuit 3c, and functions as a communication frequency control portion and a data modulation and demodulation control portion.

The error rate monitor circuit 3g operates on direct current power supplied from the rectification circuit 3f. The error rate monitor circuit 3g calculates an error rate of the demodulated data which is demodulated by the modulation and demodulation circuit 3c, and transmits it to the control circuit 3a. The control circuit 3a operates on direct current power supplied from the rectification circuit 3f. The control circuit 3a receives the demodulated data which is demodulated by the modulation and demodulation circuit 3c, and operates the load 5A. Such an operation takes place in each of slaves 3A, . . . 3Z, equivalently. Thereby, the data may be transmitted from the master 2 to the slaves 3A, . . . 3Z.

In contrast, the slaves 3A, . . . 3Z transmit data as follows. The control circuit 3a modulates data to form a modulation signal using the modulation and demodulation circuit 3c and outputs the modulation signal to the aperture antenna 3i using the communication matching circuit 3e. The aperture antenna 3i outputs the modulation signal as a radio wave signal.

The twisted wires 4 are extended from the main body 2f of the master 2 to proximity of each of the slaves 3A, . . . 3Z. The twisted wires 4 are a twisted-pair cable of UTP (unsealed twisted pair), for example. At the time of signal transmission by the master 2, the energization current by the high-frequency signal generates magnetic fluxes in between adjoining twisted portions 4A, 4B, . . . and the adjoining magnetic fluxes are reverse to each other to cancel each other, helping prevent the external output of noises. In contrast, at the time of signal reception of the master 2, a pair of twisted wires 4 have few flux linkage regions in response to radio waves coming from outside, thereby being less vulnerable to the radio waves. Therefore, this configuration is suitable for suppressing the noise generation and eliminating noises coming from the outside.

Among several opening areas between the several twisted portions 4A, . . . in the twisted wires 4, an opening area in between the twisted portions 4A and 4B faces the aperture antenna 3h of the slave 3A. In addition, an opening area in between the twisted portions 4C and 4D faces the aperture antenna 3i of the slave 3A.

Further, as illustrated in FIG. 1, similarly, the aperture antenna 3h of each slave 3B, . . . 3Z faces an opening area in between the twisted portions 4E and 4F, . . . , 4I and 4J. Further, the aperture antenna 3i of each slave 3B, . . . 3Z faces an opening area in between the twisted portions 4G and 4H, . . . , 4K and 4L.

In order to illustrate arrangement positions of the twisted portions 4A, 4L in FIG. 1, the opening areas of the twisted wires 4 (in between the twisted portions 4A to 4B, 4E to 4F, . . . , 4I to 4J) and the opening areas of the aperture antennas 3h are opposite with respect to x direction alone.

Further, the opening areas of the twisted wires 4 (in between the twisted portions 4C to 4D, 4G to 4H, . . . , 4K to 4L) and the opening areas of the aperture antennas 3i are opposite with respect to x direction alone. However, they are opposite actually with respect to y direction, too, as illustrated in FIG. 3. Thus, the opening areas of the twisted wires 4 and the openings of the aperture antennas 3h or aperture antennas 3i overlap.

Therefore, the electromagnetic field generated in each of the opening areas in between the twisted portions (4A, 4B, . . . , 4G, 4H, . . . , 4K, 4L) of the twisted wires 4 forms an electromagnetic induction connection with each of the aperture antennas 3h. 3i of the slaves 3A, . . . , 3Z. Each aperture antenna 3h, 3i of the slaves 3A, . . . , 3Z may receive electric power and data modulation signals in a contactless manner via the electromagnetic field produced in the opening areas in between twisted portions 4A to 4B, . . . , 4K to 4L of the twisted wires 4.

Thereby, each slave 3A, . . . , 3Z can receive the data modulation signals as well as the power signals for power supply favorably. Further, each slave 3A, . . . , 3Z can also transmit reply signals favorably. In addition, when each slave 3A, . . . , 3Z transmits reply signals from the aperture antenna 3i, the master 2 can receive the reply signals in a contactless manner via the opening areas in between the twisted portions (4A, 4B, . . . , 4G, 4H, . . . , 4K, 4L) of the twisted wires 4.

In addition, the twisted wires 4 may be provided such that only regions or opening areas in between the twisted portions 4A to 4B, 4C to 4D, . . . , 4K to 4L that face the aperture antennas 3h and 3i of each slave 3A, . . . , 3Z are larger than other regions or opening areas. This configuration is suitable for suppressing noise generation and eliminating noises coming from the outside while strengthening an electromagnetic induction connection between the twisted wires 4 and the aperture antennas 3h and 3i.

Figure 6A:
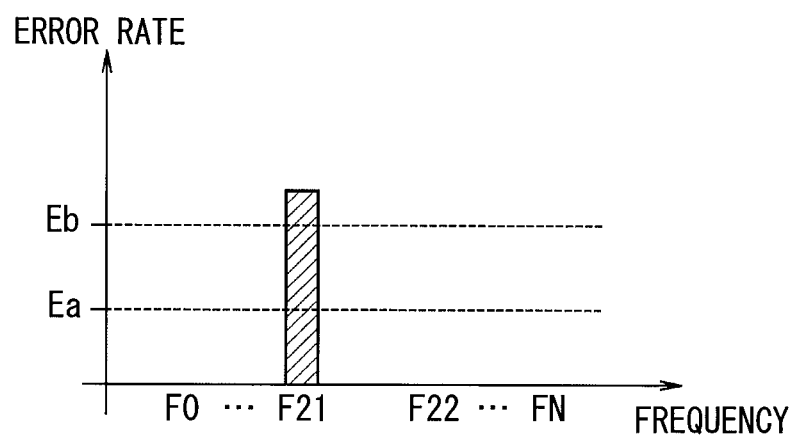
FIGS. 6A, 6B are characteristic diagrams illustrating frequency dependency of error rates detected by an error rate monitor portion.
Figure 6B:
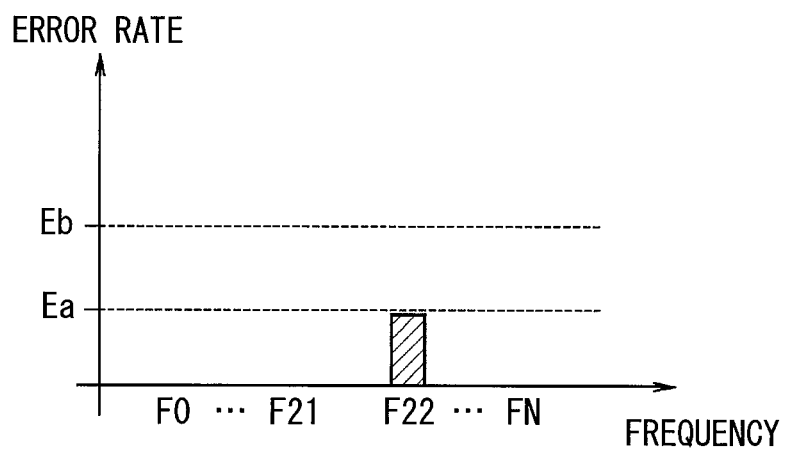

FIGS. 6A, 6B illustrate examples of an error rate detected by the error rate monitor circuit 3g. In the drawings, Eb is a maximum allowable error rate of the system 1;

Ea is an upper limit of the error rate that provides a high quality communication. When the reception error rate exceeds Eb as illustrated in FIG. 6A, the matching characteristic is adjusted in the matching circuit 2e and the communication matching circuit 3e, or the communication frequency of the communication carrier are changed in the modulation and demodulation circuits 2c and 3c (F0→FN), thereby reducing the error rate to achieve a high quality communication as illustrated in FIG. 6B. In addition, the modulation and demodulation type of the modulation and demodulation circuits 2c and 3c may be changed.

The master 2 operates in a usual mode or an adjustment mode.

The master 2 communicates in the power line communication with the slaves 3A, . . . , 3Z in the normal mode. At a start-up or activation, the master 2 moves to the adjustment mode that includes a communication frequency adjustment mode and a modulation and demodulation type adjustment mode, thereby adjusting a communication frequency (communication carrier frequency of the modulation and demodulation circuits 2c and 3c), a matching characteristic, and a modulation and demodulation type which are used for power line communication. In such a case, the slaves 3A to 3Z perform communication feedback to the master 2, and communicate data using the data communication frequency band. The communication frequency, the matching characteristic, and the modulation and demodulation mode are adjusted between the master 2 and the slaves 3A to 3Z.

The master 2 performs adjustments with all the slaves 3A to 3Z in the communication frequency adjustment mode and modulation and demodulation type adjustment mode. After completing the adjustments with all the slaves 3A to 3Z, a usual power line communication process is performed. An adjustment process in the communication frequency adjustment mode and the modulation and demodulation type adjustment mode will be explained as a feature of the present embodiment. It is further noted that a flowchart in the present application includes sections (also referred to as steps), which are represented, for instance, as S1, T1, or the like. Further, each section can be divided into several sections while several sections can be combined into a single section. Furthermore, each of thus configured sections can be referred to as a module, device, or means and achieved not only (i) as a software section in combination with a hardware unit (e.g., computer), but also (ii) as a hardware section, including or not including a function of a related apparatus. Further, the hardware section may be inside of a microcomputer.

Figure 8:
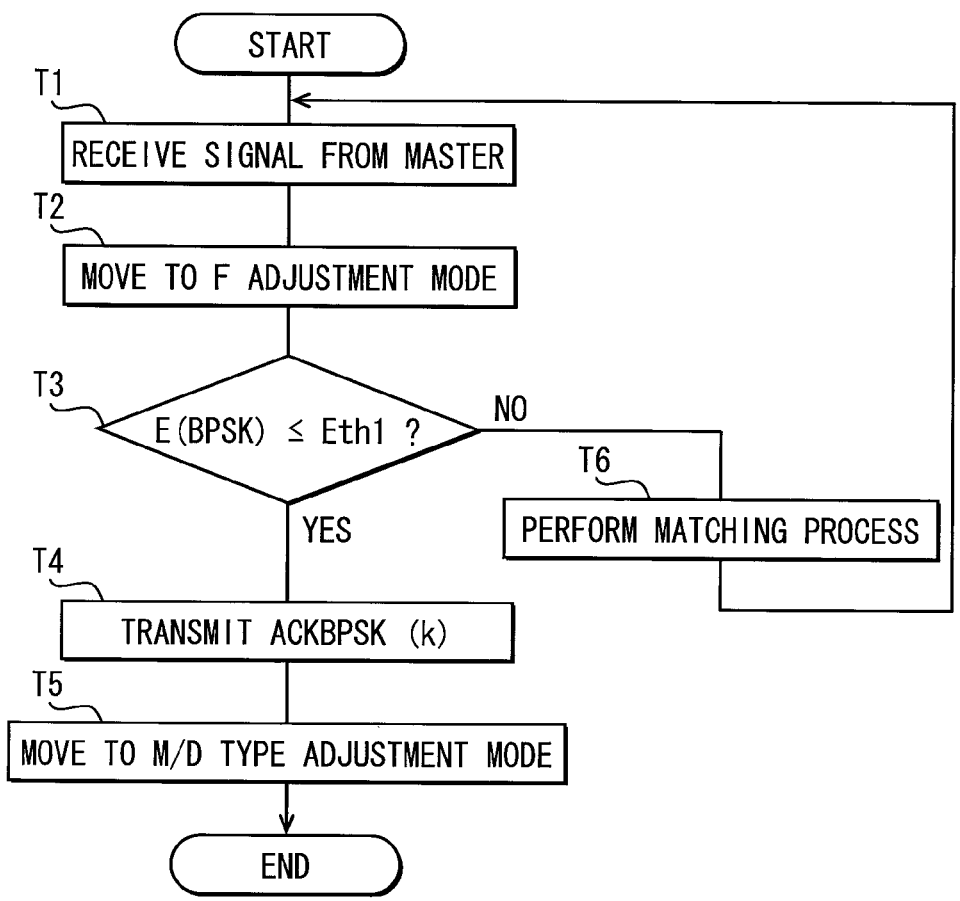
FIG. 8 is a flowchart diagram illustrating a process by a slave in a communication frequency adjustment mode.

The following will explain an operation in the adjustment mode between the master 2 and the slaves 3A to 3Z with reference to FIGS. 7, 8. When the master 2 starts, the modulation and demodulation circuit 2c initially sets a communication frequency F (=F0: communication carrier frequency) in response to a frequency instruction of the control circuit 2a (S1). The data is modulated with a prescribed modulation and demodulation type (for example, BPSK (Binary Phase Shift Keying)) on the carrier of the set communication frequency F. The superimposition and separation circuit 2d superimposes the data modulation signal of the modulation and demodulation circuit 2c on the power signal outputted by the high-frequency power generation circuit 2b, thereby outputting to the twisted wires 4 via the matching circuit 2e.

At this time, the master 2 moves to the adjustment mode of the communication frequency F when outputting the signal (the power signal, the data modulation signal) to the twisted wires 4 first after starting (S2), then waiting for replay signals from the slaves 3A to 3Z. At this time, when the number of the slaves 3A to 3Z connected to the master 2 is N, the master 2 waits until receiving ACKBPSK (k) (k=1 to Z) from all the N slaves 3A to 3Z (S3).

In contrast, as illustrated in FIG. 8, after starting, each slave 3A to 3Z receives an output signal of the master 2; the output signal includes a power signal and a data modulation signal (T1). Then, each slave 3A to 3Z moves to the adjustment mode of the communication frequency F (T2). In the adjustment mode, each slave 3A to 3Z demodulates the BPSK modulated data with the modulation and demodulation circuit 3c, and determines whether the error rate E(BPSK) of the demodulated data is less than a predetermined threshold level Eth1 (T3) using the error rate monitor circuit 3g. It is noted that the threshold level Eth1 is equivalent to a first predetermined level and indicates a threshold level of the error rate which the system 1 can permit. Further, the threshold level Eth1 is equivalent to Eb in FIG. 6A or a threshold level with a margin against Eb. More preferably, the threshold level Eth1 may be equivalent to Ea in FIG. 6B enabling a high quality communication or a threshold level with a margin against Ea.

When the error rate E(BPSK) of the demodulated data is less than the predetermined threshold level Eth1, each slave 3A to 3Z transmits ACKBPSK(k) (k=1 to Z) to the master 2 as a reply signal (T4), and advances to the modulation and demodulation type adjustment mode (T5).

When receiving ACKBPSK (k) from the slave 3A (S3: YES), the master 2 completes the adjustment of the communication frequency (S4), ending the communication frequency adjustment mode and advancing to the modulation and demodulation type adjustment mode (S5).

In contrast, when the error rate E(BPSK) of the demodulated data exceeds the predetermined threshold level Eth1 (T3: NO), each slave 3A to 3Z performs a matching process (T6). The impedance match may be insufficient at the beginning of the adjustment mode; thus, the error rate E(BPSK) of the data received by the slave 3A to 3Z may be too high.

When the error rate E(BPSK) exceeds the predetermined level Eth1, the matching process is performed (T6). When the capacity value of the variable capacity capacitor 3k is adjusted step by step, the error rate E(BPSK) of the data received by the slave 3A may be made low.

When the error rate E(BPSK) of the received data is made less than the predetermined threshold level Eth1 according to the matching adjustment with the communication matching circuit 3e (T3: YES), the control circuit 3a transmits ACKBPSK(k) (T4), and advances to the modulation and demodulation type adjustment mode (T5).

Although waiting until receiving ACKBPSK (k) from all the N slaves 3A to 3Z, the master 2 may eventually not receive ACKBPSK(k) from all the slaves 3A to 3Z. In such a case, the master 2 changes the communication carrier frequency F one by one (F=F0→F1→F2→ . . . →Fn: S6).

This permits the slaves 3A to 3Z to decrease the error rate E(BPSK) of the received data. When the error rate E(BPSK) becomes less than the threshold level Eth1 at T3 in FIG. 8, the control circuit 3a transmits ACKBPSK (k) at T4. The slave 3A to 3Z advances to the modulation and demodulation type adjustment mode at T5.

Figure 9:
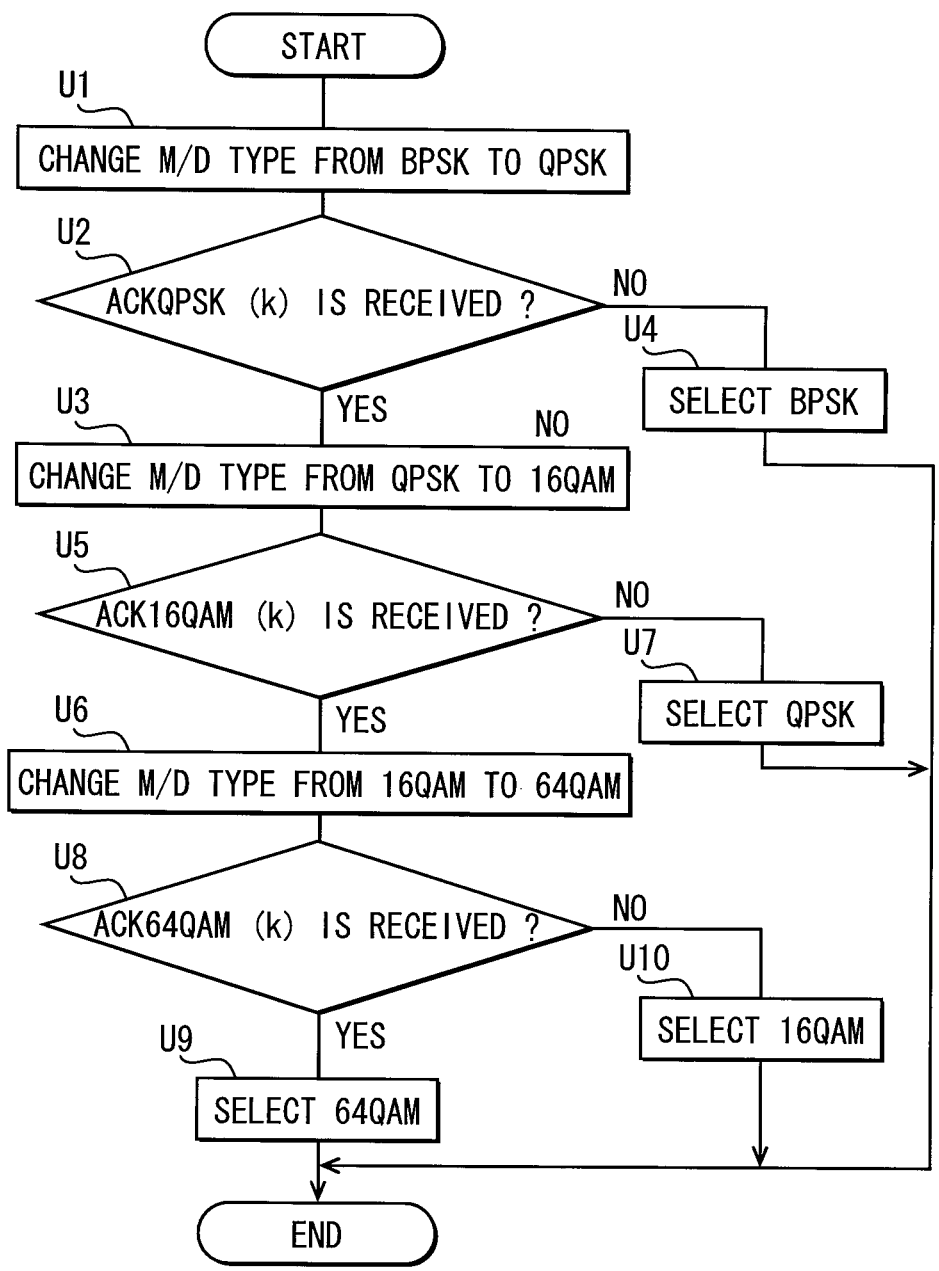
FIG. 9 is a flowchart diagram illustrating a process by a master in a modulation and demodulation type adjustment mode.
Figure 10:
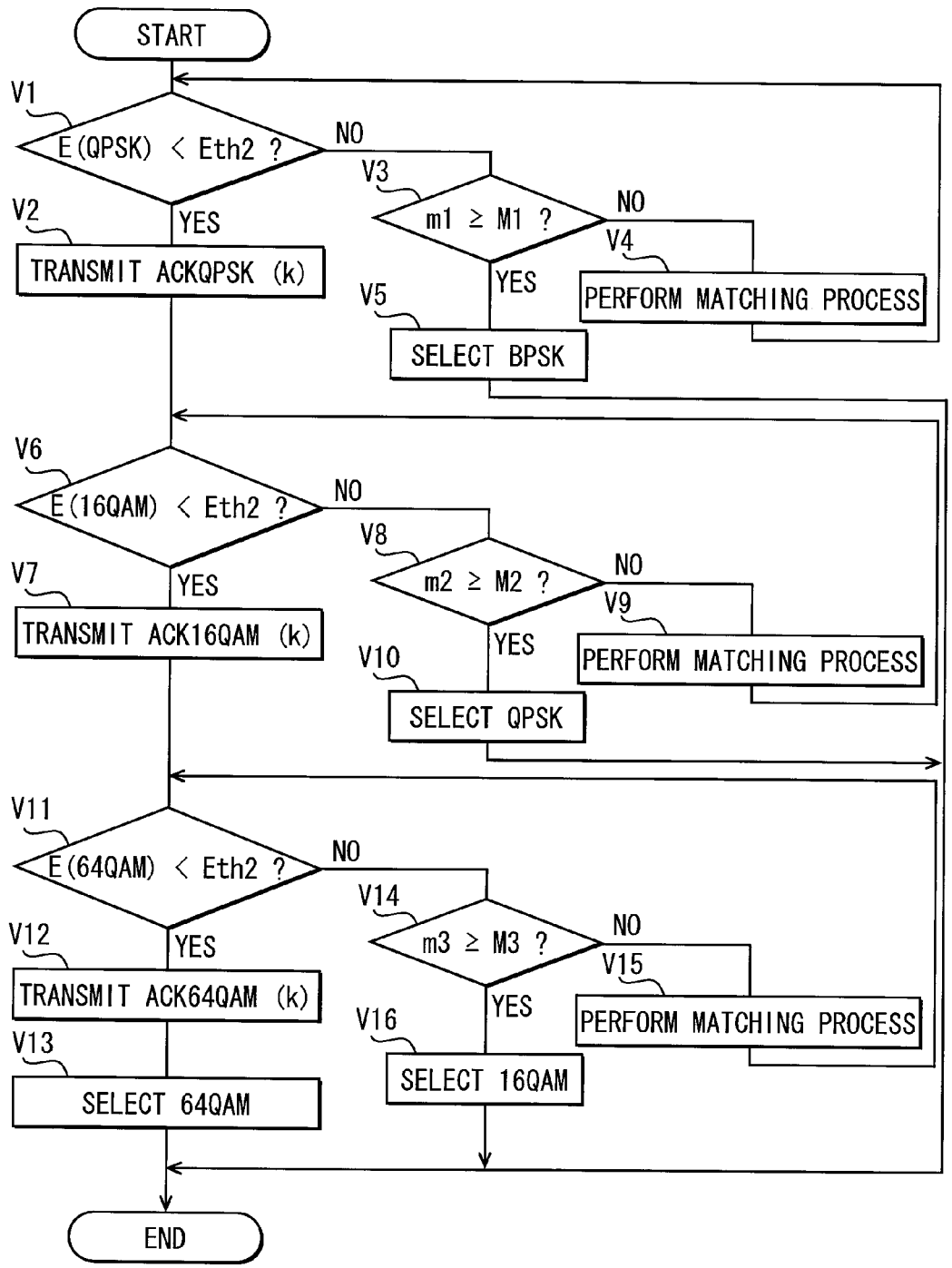
FIG. 10 is a flowchart diagram illustrating a process by a slave in a modulation and demodulation type adjustment mode.

The following will explain operations of the master 2 (control circuit 2a) and the slave 3A to 3Z (control circuit 3a) in the modulation and demodulation type adjustment mode after the end of the communication frequency adjustment mode with reference to FIG. 9 and FIG. 10.

As illustrated in the master side operation in FIG. 9, when advancing to the modulation and demodulation type adjustment mode, the master 2 increases the communication data rate first. To that end, the master 2 changes the modulation and demodulation type of the modulation and demodulation circuit 2c from BPSK to QPSK (Quadrature Phase Shift Keying) at U1 to increase the number of assignment data per symbol by one level. That is, the number of assignment data per one symbol of BPSK is two data per symbol; the number of assignment data per symbol of QPSK is four data per symbol. The master 2 transmits the modulated data to the slaves 3A to 3Z. The information on the modulation and demodulation type is assigned to the communication header and transmitted to the slaves 3A to 3Z.

In contrast, the slaves 3A to 3Z calculates the error rate E(QPSK) of the QPSK-demodulated data as illustrated in FIG. 10, and determines whether the error rate E(QPSK) is less than a threshold level Eth2 (at V1).

The threshold level Eth2 has a value that is equal to or greater than the Eth1 and equivalent to a second predetermined level. The threshold level Eth2 may be the maximum error rate Eb allowable in the system 1 or a predetermined level with a margin against Eb. More preferably, the threshold level Eth2 may be the error rate Ea enabling a high quality communication or a predetermined level with a margin against Ea. That is, the slaves 3A to 3Z determines whether to receive the QPSK-modulated data. Each slave 3A to 3Z transmits ACKQPSK(k) (k=1 to Z) to the master 2 at V2 when the conditions at V1 is satisfied.

In contrast, when the control circuit 3a determines that the error rate E(QPSK) is less than the threshold level Eth2 at V1, counts the number of matching times m1, dividing the process depending on the counting result. For example, it is determined whether the number of matching times m1 is greater than a predetermined number of times M1 (at V3).

The number of matching times m1 signifies the number of times the communication matching circuit 3e performs the matching process with the aperture antenna 3i depending on control by the control circuit 3a. The control circuit 3a stores this number of matching times m1. When moving to the QPSK modulation and demodulation type, the error rate may be high. In such a case, the matching process is performed at V4, where the capacity value of the variable capacity capacitor 3k is adjusted step by step. The error rate of the data received by the slaves 3A to 3Z may be gradually made low.

Thus, when the error rate E(QPSK) becomes less than the predetermined threshold level Eth2 in response to the matching process at V4 by the communication matching circuit 3e (V1: YES), the slaves 3A to 3Z transmit ACKQPSK(k) to the master 2 at V2.

In contrast, when the error rate E(QPSK) remains not less than the predetermined threshold level Eth2 regardless of equal to or greater than a predetermined number of matching times M1 (V3: YES), QPSK is changed to BPSK in order to decrease the number of communications data per symbol by one step at V5. Then, the modulation and demodulation type adjustment mode is ended.

As illustrated in FIG. 9. when the master 2 receives ACK-QPSK(k) (k=1 to Z) from all the slaves 3A to 3Z (U2: YES), the modulation and demodulation type of the modulation and demodulation circuit 2c is changed to increase the data rate. That is, QPSK is changed to 16QAM (16 Quadrature Amplitude Modulation). The number of assignment data per symbol of 16QAM type is sixteen data per symbol; the number of assignment data per symbol of QPSK is four data per symbol. Then, the 16QAM-modulated data are transmitted to the slaves 3A to 3Z; then, the master 2 waits.

When any one of the slaves 3A to 3Z does not transmit ACKQPSK(k), the master 2 naturally does not receive ACK-QPSK(k) from all the slaves 3A to 3Z. At this time, the master 2 selects BPSK as a communication phase (at U4), and ends the modulation and demodulation type adjustment mode. In this case, the master 2 notifies all the slaves 3A to 3Z that BPSK is selected as a communication phase.

The master 2 transmits the 16QAM-modulated data to the slaves 3A to 3Z. The slaves 3A to 3Z calculates the error rate(16QAM) E of the 16QAM-demodulated data using the error rate monitor circuit 3g, and determines whether the error rate E(16QAM) is less than a threshold level Eth2 (at V6).

That is, the slaves 3A to 3Z determine whether to receive the 16QAM-modulated data. The control circuit 3a of each slave 3A to 3Z transmits ACKQPSK(k) (k=1 to Z) to the master 2 at V7 when the conditions at V6 is satisfied.

In contrast, when it is determined that the error rate E(16QAM) is less than the threshold level Eth2 at V6, the number of matching times m2 is counted, and the process branches depending on this counting result. For example, it is determined whether the number of matching times m2 is equal to or greater than the predetermined number of times M2 (at V8).

The number of matching times m2 signifies the number of times the communication matching circuit 3e performs the matching process with the aperture antenna 3i depending on control by the control circuit 3a. The control circuit 3a stores this number of matching times m2. The error rate may be high when the modulation and demodulation type is changed into the 16QAM modulation and demodulation type. In such a case, the matching process is performed by the communication matching circuit 3e (at V9). When the capacity value of the variable capacity capacitor 3k is adjusted step by step, the error rate E of the data received by the slave 3A to 3Z may be made low.

Thus, when the error rate E(16QAM) becomes less than the predetermined threshold level Eth2 in response to the matching process at V9 by the communication matching circuit 3e (V6: YES), ACK16QAM(k) is transmitted to the master 2 (at V7).

In contrast, when the error rate E(16QAM) remains not less than the predetermined threshold level Eth2 regardless of equal to or greater than a predetermined number of matching times M2 (V8: YES), 16QAM is changed to QPSK in order to decrease the number of communications data per symbol by one step at V10. Then, the modulation and demodulation type adjustment mode is ended.

As illustrated in FIG. 9, when receiving ACK16QAM(k) (k=1 to Z) from all the slaves 3A to 3Z (U5: YES), the master 2 changes the data rate from 16QAM to 64QAM (i.e., 16 data per symbol→64 data per symbol) at U6. Then, the 64QAM-modulated data are transmitted to the slaves 3A to 3Z.

However, when any one of the slaves 3A to 3Z does not transmit ACK16QAM(k), the master 2 naturally does not receive ACK16QAM(k) from all the slaves 3A to 3Z. In this case, 16QAM is changed to QPSK in order to decrease the number of communication data per symbol by one step at U7. Then, the modulation and demodulation type adjustment mode is ended. In this case, the master 2 notifies all the slaves 3A to 3Z that QPSK is selected as a communication phase.

The master 2 transmits the 64QAM-modulated data to the slaves 3A to 3Z. As illustrated in FIG. 10, in the slaves 3A to 3Z, the error rate E(64QAM) of the 64QAM-demodulated data is calculated, and it is determined whether the error rate E(64QAM) is less than the threshold level Eth2 (at V11). That is, the slaves 3A to 3Z determine whether to receive the 64QAM-modulated data. Each slave 3A to 3Z transmits ACK64QAM(k) (k=1 to Z) to the master 2 at V12 when the condition at V11 is satisfied.

In contrast, when it is determined that the error rate E(64QAM) is less than the threshold level Eth2 at V11, the number of matching times m3 is counted, and the process branches depending on this counting result. For example, it is determined whether the number of matching times m3 is equal to or greater than a predetermined number of times M3 (at V14).

Like the above-mentioned, the number of matching times m3 signifies the number of times the communication matching circuit 3e performs the matching process with the aperture antenna 3i depending on control by the control circuit 3a. The control circuit 3a stores this number of matching times m3. When the 64QAM modulation and demodulation type is selected, the error rate may be high. In such a case, the matching process is performed by the communication matching circuit 3e (at V15). When the capacity value of the variable capacity capacitor 3k is adjusted step by step, the error rate E of the data received by the slave 3A to 3Z may be made low.

Thus, when the error rate E(64QAM) becomes less than the predetermined threshold level Eth2 in response to the matching process at V15 by the communication matching circuit 3e (V11: YES), the slaves 3A to 3Z transmit ACK64QAM(k) to the master 2 at V12. This case selects 64QAM as a communication phase at V13, permitting the present system 1 to have the greatest data rate.

In contrast, when the error rate E(64QAM) remains not less than the predetermined threshold level Eth2 regardless of equal to or greater than a predetermined number of matching times M3 (V14: YES), the communication phase selects 16QAM in order to decrease the number of communications data per symbol by one step at V16. Then, the modulation and demodulation type adjustment mode is ended.

As illustrated in FIG. 9, when the master 2 receives ACK64QAM(k) (k=1 to Z) from all the slaves 3A to 3Z (U8: YES), the master 2 selects 64QAM as a communication phase (at U9), and ends the modulation and demodulation type adjustment mode.

However, when any one of the slaves 3A to 3Z does not transmit ACK64QAM(k), the master 2 naturally does not receive ACK64QAM(k) from all the slaves 3A to 3Z. At this time, the master 2 selects 16QAM as a communication phase (at U10), and ends the modulation and demodulation type adjustment mode. In this case, the master 2 notifies all the slaves 3A to 3Z that 16QAM is selected as a communication phase.

Thus, the master 2 and the slaves 3A to 3Z adjust the modulation and demodulation type. The above procedure or processes are undergone to determine the communication frequency and the modulation and demodulation type.

Figure 11:
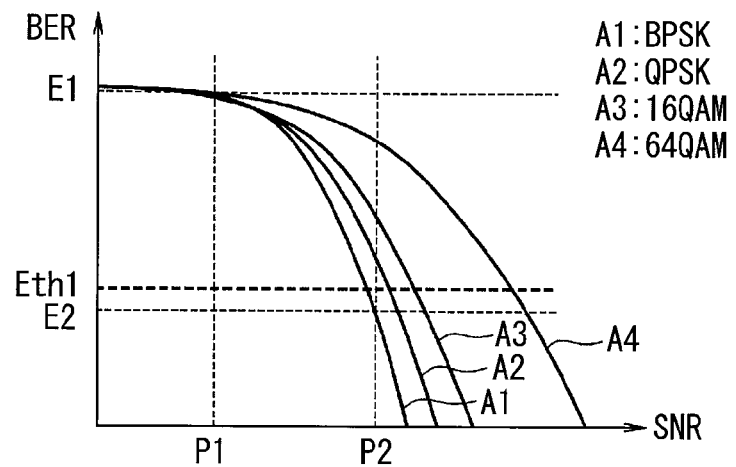
FIG. 11 is a BER-SNR characteristic diagram illustrating a change of an error rate in a communication frequency adjustment mode.
Figure 12:
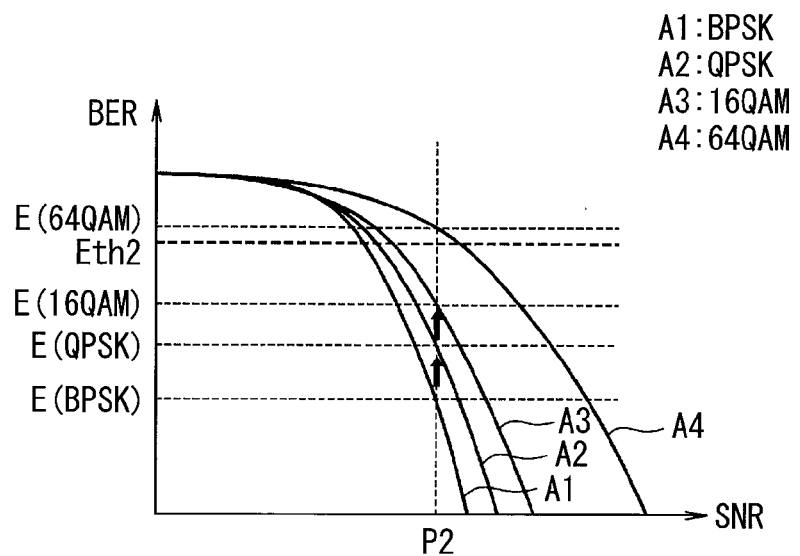
FIG. 12 is a BER-SNR characteristic diagram illustrating a change of an error rate in a modulation and demodulation type adjustment mode.

FIG. 11 and FIG. 12 illustrate BER (Bit Error Rate) versus SNR (Signal to Noise Ratio) of communication types for explaining the communication frequency adjustment mode and modulation and demodulation type adjustment mode.

As illustrated in FIG. 11 and FIG. 12, SNR of the carrier can be increased based on the adjustment of the communication frequency according to the property control of the matching circuit 2e and the communication matching circuit 3e, or the communication frequency control of the modulation and demodulation circuit 2c. With the increase of SNR, the BER decreases. When selecting a modulation and demodulation type having a greater assignment bit number per symbol, the BER tends to become higher on a condition that SNR is similar.

As explained above, in the communication frequency adjustment mode, the error rate is made equal to or less than the threshold level Eth1 when the BPSK modulation and demodulation type is applied. Therefore, as illustrated in FIG. 11, the communication frequency, which corresponds to SNR: P2, is adjusted to satisfy the condition that the error rate is less than the threshold level Eth1 when the BPSK modulation and demodulation type is applied.

Figure 13:
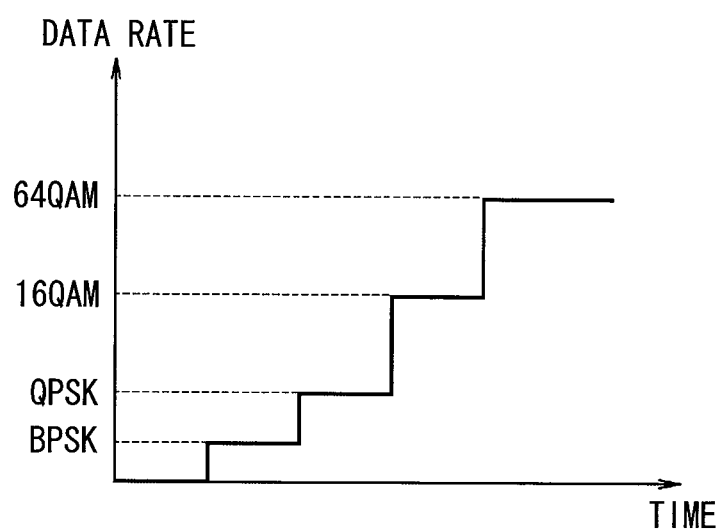
FIG. 13 is a time change characteristic diagram for data rate.

In addition, in the modulation and demodulation type adjustment mode, the modulation and demodulation mode is selected to satisfy the condition that the error rate is less than the threshold level Eth2 (≥Eth1). Therefore, as illustrated in FIG. 12, the modulation and demodulation type is changed in order of BPSK→QPSK→16QAM→64QAM. When the modulation and demodulation type is changed in this predetermined order, the number of assignment bits per symbol increases in the predetermined order, increasing the data rate as illustrated in FIG. 13. As illustrated in FIG. 12, even when SNR is unchanged at this time, the error rate increases in the predetermined order. In the example illustrated in FIG. 12, when selecting a modulation and demodulation type satisfying the condition that the error rate is less than the threshold level Eth2, the 16QAM type is selected.

Features of First Embodiment

In the present embodiment, an opening area in between the twisted portions 4A to 4B of the twisted wires 4 faces an opening area of the aperture antenna 3h of the slave 3A to 3Z; thus, electric power can be distributed using the twisted wire 4. The master 2A can transmit a data modulation signal while receiving a reply signal. Further, the use of the pair of twisted wires 4 decreases leakage magnetic flux. Thereby, the electric power and the data modulation signal can be propagated efficiently; the contactless power line communication can be performed efficiently between the master 2 and slaves 3A to 3Z.

The master 2 may divide or distribute the electric power and the data modulation signal into the slaves 3A to 3Z. Dividing does not need other components such as a harness and a connector. In addition, each slave 3A to 3Z contains an error rate monitor circuit 3g to measure an error rate, and ends a communication frequency adjustment mode on a condition that the measurement result of the error rate is less than the predetermined threshold level Eth1.

In contrast, when the error rate becomes equal to or greater than the predetermined threshold level, the matching circuit 3e of the slave 3A performs a matching process. Thereby, the data communication between the master 2 and the slaves 3A to 3Z may be made with high quality and high speed.

Even when performing a matching process, the slaves 3A to 3Z may not transmit ACKBPSK(k). In such a case, the master 2 naturally does not receive any ACKBPSK(k). At this time, the master 2 changes the carrier communication frequency of the modulation and demodulation circuit 2c. Changing the communication frequency of the modulation and demodulation circuit 2c makes the communication between the master 2 and the slaves 3A to 3Z favorable.

In addition, in the modulation and demodulation type adjustment mode, BPSK is changed into other modulation and demodulation types such as QPSK, 16QAM, and 64QAM having higher data rates than BPSK one by one; the slaves 3A to 3Z perform matching processes.

The slaves 3A to 3Z repeat matching processes using the communication matching circuit 3e until the number of matching times m1, m2, m3 reaches predetermined number of times M1, M2, M3. In contrast, the slaves 3A to 3Z ends the matching process when the number of matching times m1, m2, m3 reaches the predetermined number of times M1, M2, M3 while selecting another modulation and demodulation type having a smaller number of assignment data per symbol by one step than the present type, thereby performing a usual power line communication process.

That is, when the error rate in the QPSK modulation and demodulation type becomes equal to or greater than the threshold level Eth2, the usual power line communication is started by selecting the BPSK communication phase having a smaller number of assignment data per symbol by one step than the QPSK communication phase.

Further, when the error rate in the QPSK modulation and demodulation type becomes less than the threshold level Eth2 and then the error rate in the 16QAM modulation and demodulation type becomes equal to or greater than the threshold level Eth2, the usual power line communication is started by selecting the QPSK communication phase having a smaller number of assignment data per symbol by one step than the 16QAM communication phase.

Further, when the error rate in the 16QAM modulation and demodulation type becomes less than the threshold level Eth2 and then the error rate in the 64QAM modulation and demodulation type becomes equal to or greater than the threshold level Eth2, the usual power line communication is started by selecting the 16QAM communication phase having a smaller number of assignment data per symbol by one step than the 64QAM communication phase. This permits the communication between the master 2 and the slaves 3A to 3Z to select a suitable modulation and demodulation type, enabling the data communication to be of a higher quality and a higher speed.

Second Embodiment

Figure 14:
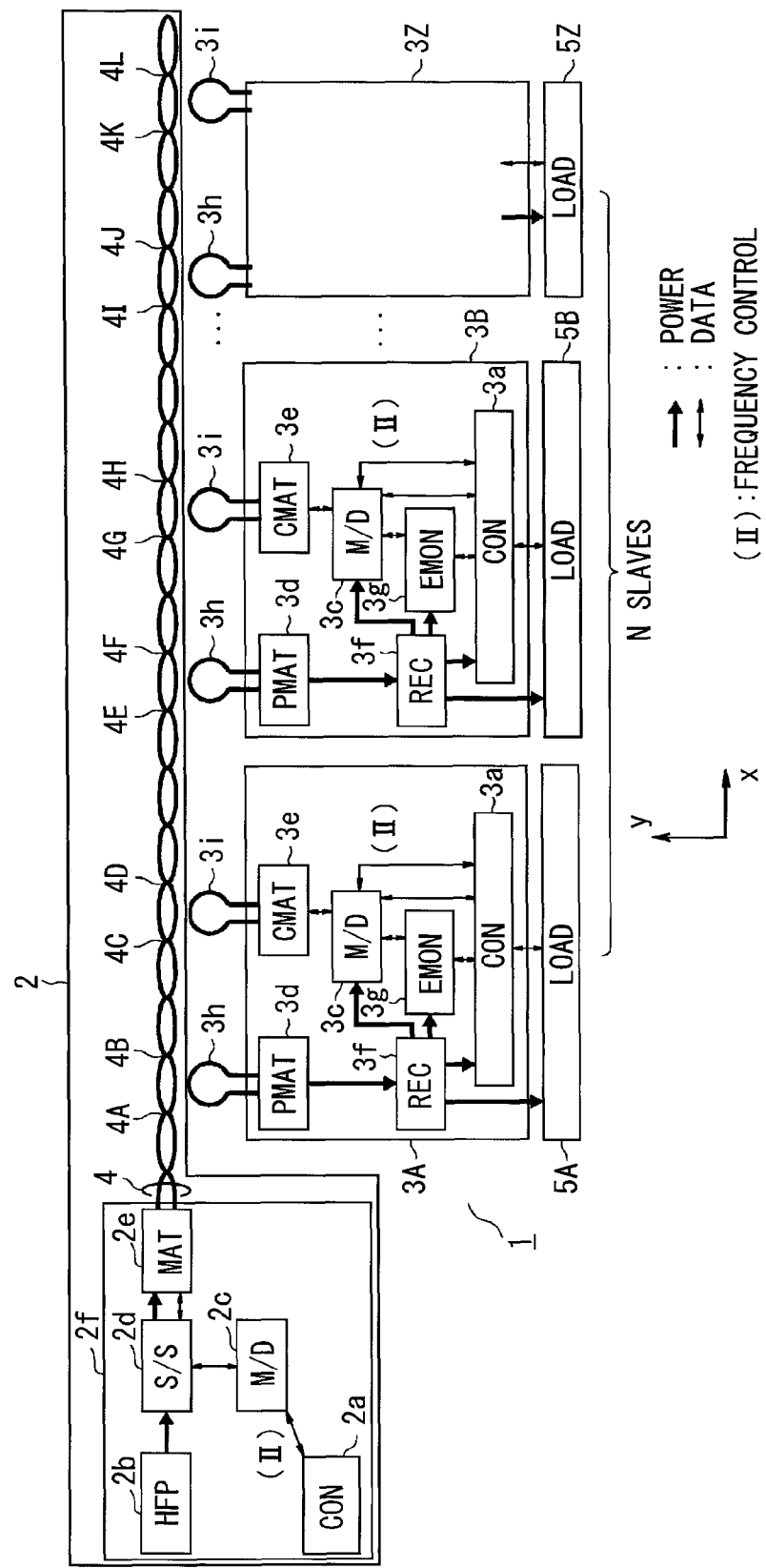
FIG. 14 is an electric block diagram schematically illustrating a vehicular power line communication system according to a second embodiment of the present disclosure.

FIG. 14 illustrates a second embodiment, which has differences from the first embodiment in that any control of impedance matching using the matching circuit 2e and the communication matching circuit 3e is not performed while only a control of communication frequency of the modulation and demodulation circuit is performed. Portions identical to those in the first embodiment are assigned with the reference signs identical to those in the first embodiment and omitted from the explanation; the different portions are only explained on a priority basis.

The following will explain portions of FIG. 14 different from FIG. 1. The control circuit 2a does not connect a control line to the matching circuit 2e. The control circuit 2a connects a control line to the modulation and demodulation circuit 2c, controlling only the communication frequency of the modulation and demodulation circuit 2c. The matching circuit 2e of the master 2 contains a fixed capacity capacitor which replaces a variable capacity capacitor 2h of the first embodiment. This configuration permits the matching circuit 2e to match a pair of twisted wires 4 having a loop shape under a predetermined impedance, precluding an impedance adjustment according to control of the control circuit 2a.

Similarly in the slave 3A to 3Z, the communication matching circuit 3e is equipped with a fixed capacity capacitor which replaces the variable capacity capacitor 3k of the first embodiment. Therefore, the communication matching circuit 3e matches with the aperture antenna 3i under a predetermined impedance, precluding an impedance adjustment according to control of the control circuit 3a.

This configuration eliminates the process at T6 in FIG. 8 in the communication frequency adjustment mode. That is, the slaves 3A to 3Z determines whether the error rate E(BPSK) is equal to or less than the predetermined threshold Eth1, whereas the master 2 changes a communication frequency of the modulation and demodulation circuit 2c when exceeding the predetermined threshold level Eth1. Thereby, the communication frequency may be changed between master 2 and the slaves 3A to 3Z.

In addition, the above configuration eliminates the processes at V3, V4, V8, V9, V14, and V15 in FIG. 10 in the modulation and demodulation type adjustment mode. While any matching process is not performed in all the slaves 3A to 3Z, a usual power line communication may be started by using a modulation and demodulation type satisfying a condition that the corresponding error rate E(QPSK), E(16QAM), or E(64QAM) is less than the predetermined level Eth2.

In addition, the above configuration does not need a control line between the control circuit 2a and the matching circuit 2e and a control line between the control circuit 3a and the communication matching circuit 3e, as compared with the first embodiment, thereby simplifying the component circuit.

Third Embodiment

Figure 15:
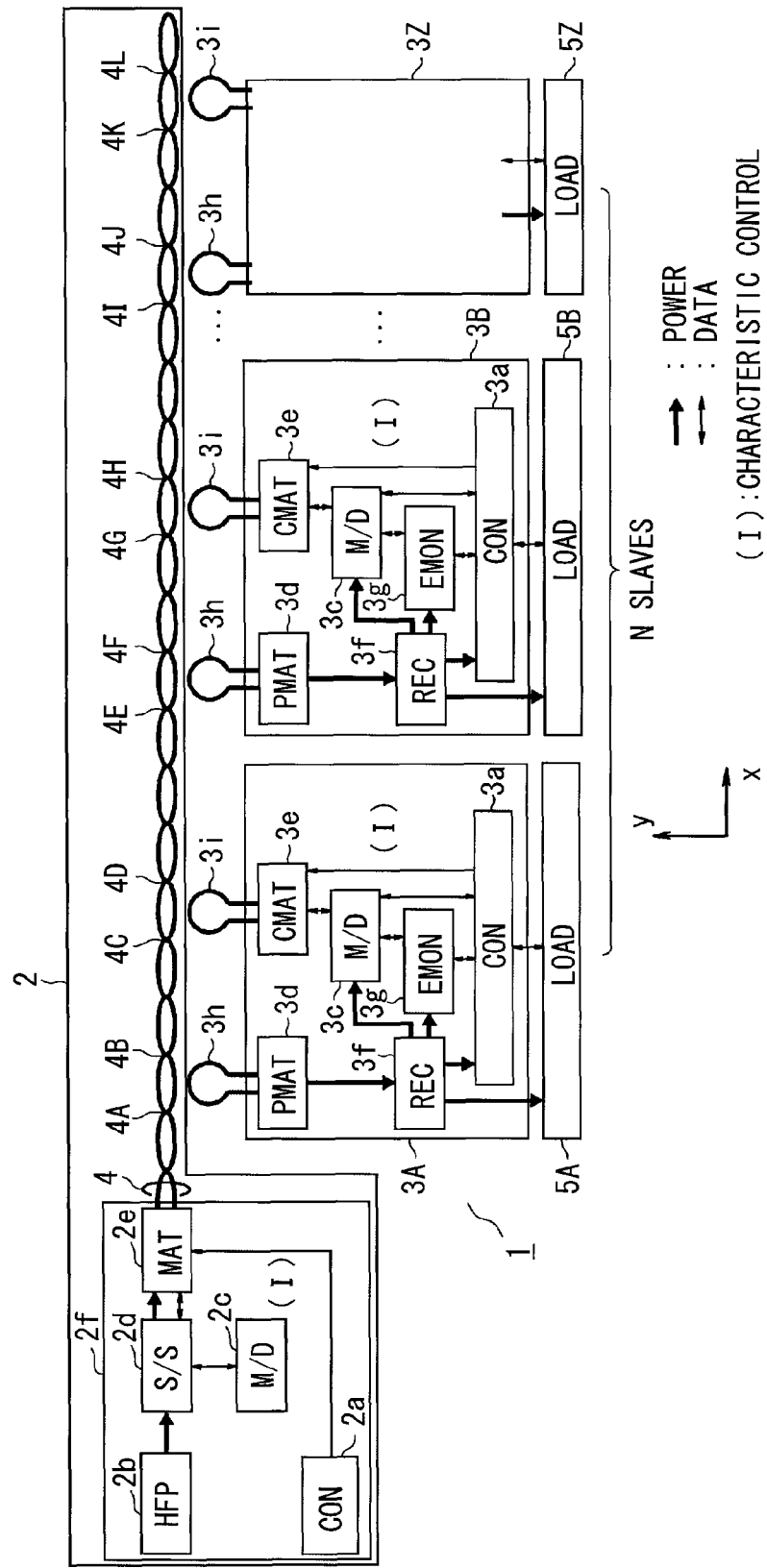
FIGS. 15, 16, 17 are electric block diagrams schematically illustrating a vehicular power line communication system according to a third embodiment of the present disclosure.
Figure 16:
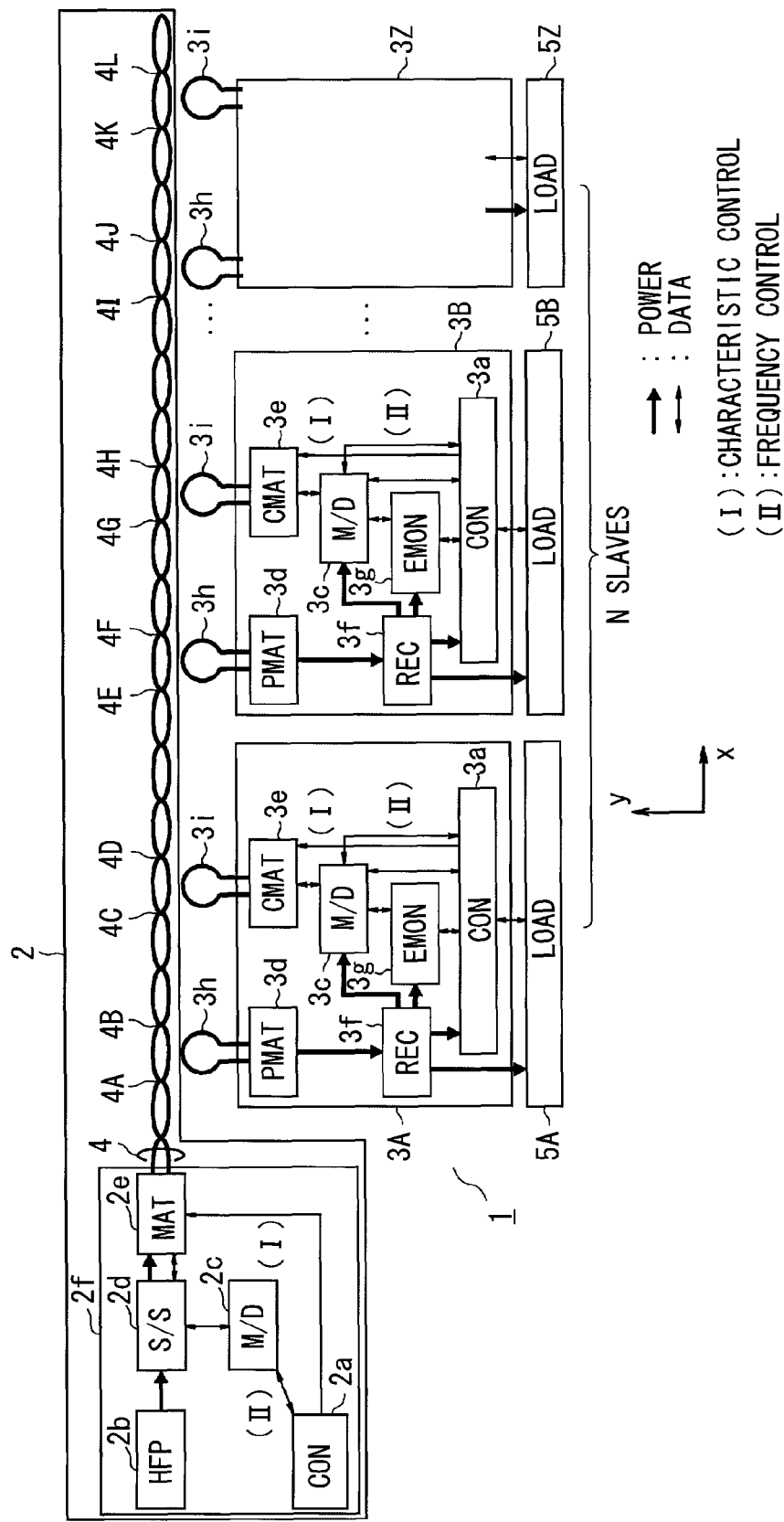
Figure 17:
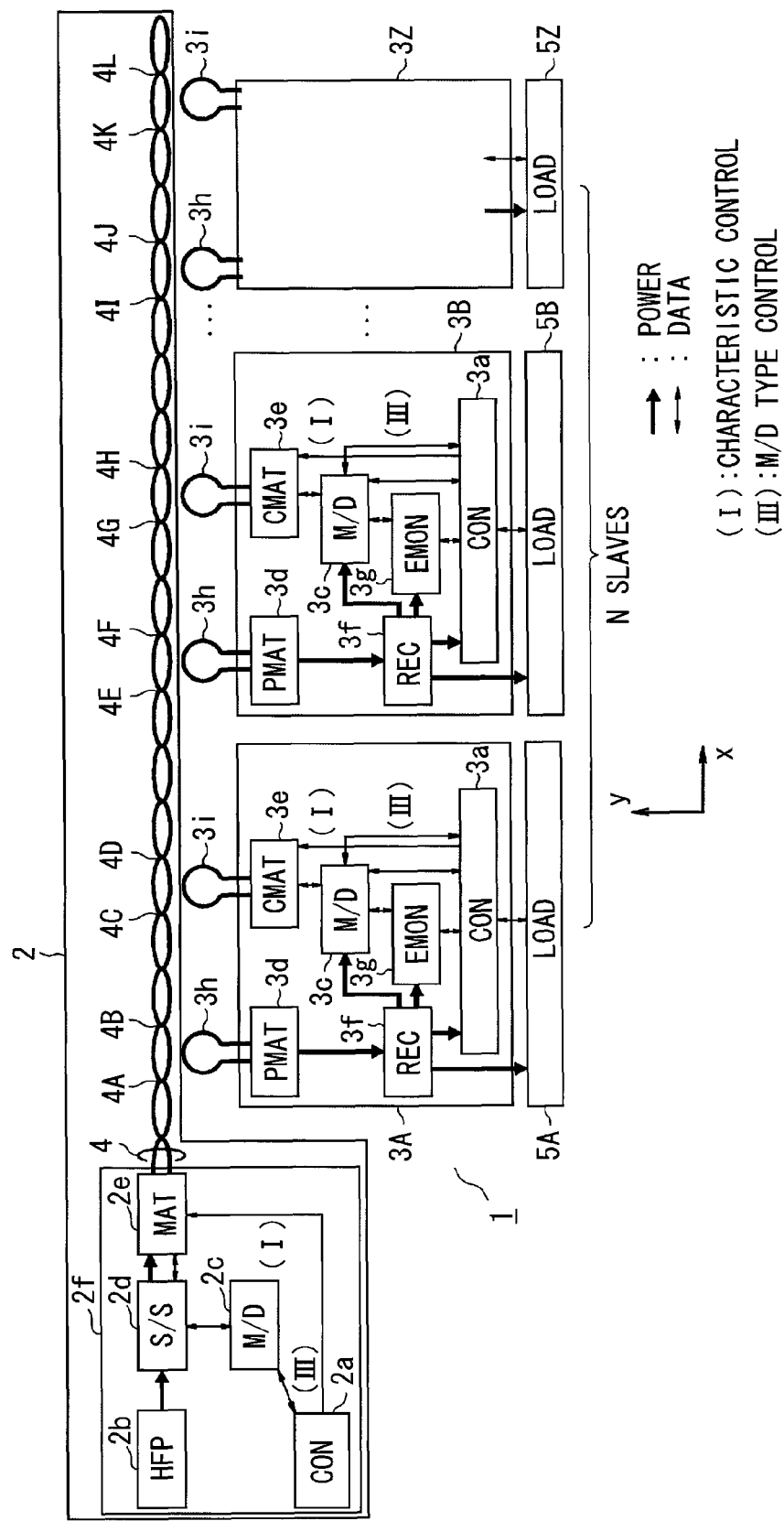

FIG. 15 to FIG. 17 illustrate a third embodiment, which has differences from the first embodiment in that at least one of the communication frequency control and the modulation and demodulation type control is excluded while controlling the characteristics of the matching circuit 2e and the communication matching circuit 3e. Portions identical to those in the first embodiment are assigned with the reference signs identical to those in the first embodiment and omitted from the explanation; the different portions are only explained on a priority basis.

The following will explain portions of FIG. 15 different from FIG. 1. The control circuit 2a of the master 2 does not connect a control line to the modulation and demodulation circuit 2c. In addition, the control circuit 3a of each slave 3A to 3Z does not connect a control line to the modulation and demodulation circuit 3c. The control circuit 2a controls a matching characteristic of the matching circuit 2e; the control circuit 3a can control a matching characteristic of the communication matching circuit 3e. In the adjustment mode, the process in the communication frequency adjustment mode illustrated in FIG. 7 and FIG. 8 is performed, whereas the process in the modulation and demodulation type adjustment mode illustrated in FIG. 9 and FIG. 10 is not performed. In addition, the process at S6 in the master 2 illustrated in FIG. 7 is changed into the process which controls the matching characteristic of the matching circuit 2e.

Then, the matching characteristic can be adjusted between the master 2 and the slaves 3A to 3Z like the first embodiment, permitting a favorable communication between the master 2 and the slaves 3A to 3Z. The above configuration does not need a control line between the control circuit 2a and the modulation and demodulation circuit 2c and a control line between the control circuit 3a and the modulation and demodulation circuit 3c, as compared with the first embodiment, thereby simplifying the component circuit.

In addition, as illustrated in FIG. 16, although the communication frequencies of the modulation and demodulation circuits 2c and 3c are controlled, whereas the modulation and demodulation type may not be controlled. In such a case, in the adjustment mode, the process in the communication frequency adjustment mode illustrated in FIG. 7 and FIG. 8 may be performed, whereas the process in the modulation and demodulation mode adjustment mode illustrated in FIG. 9 and FIG. 10 may not be performed.

In addition, as illustrated in FIG. 17, although the modulation and demodulation type controls of the modulation and demodulation circuits 2c and 3c are controlled, whereas the communication frequency control may not be performed. In such a case, in the adjustment mode, the process in the communication frequency adjustment mode illustrated in FIG. 7 and FIG. 8 as well as the process in the modulation and demodulation mode adjustment mode illustrated in FIG. 9 and FIG. 10 may be performed. The process at S6 in FIG. 7 may be replaced with a matching process of the matching circuit 2e.

The above configuration may control a matching characteristic of the matching circuit 2e and the communication matching circuit 3e, providing an effect similar to that of the first embodiment. Further, the number of control lines may be lessened, simplifying the circuit.

Fourth Embodiment

Figure 18:
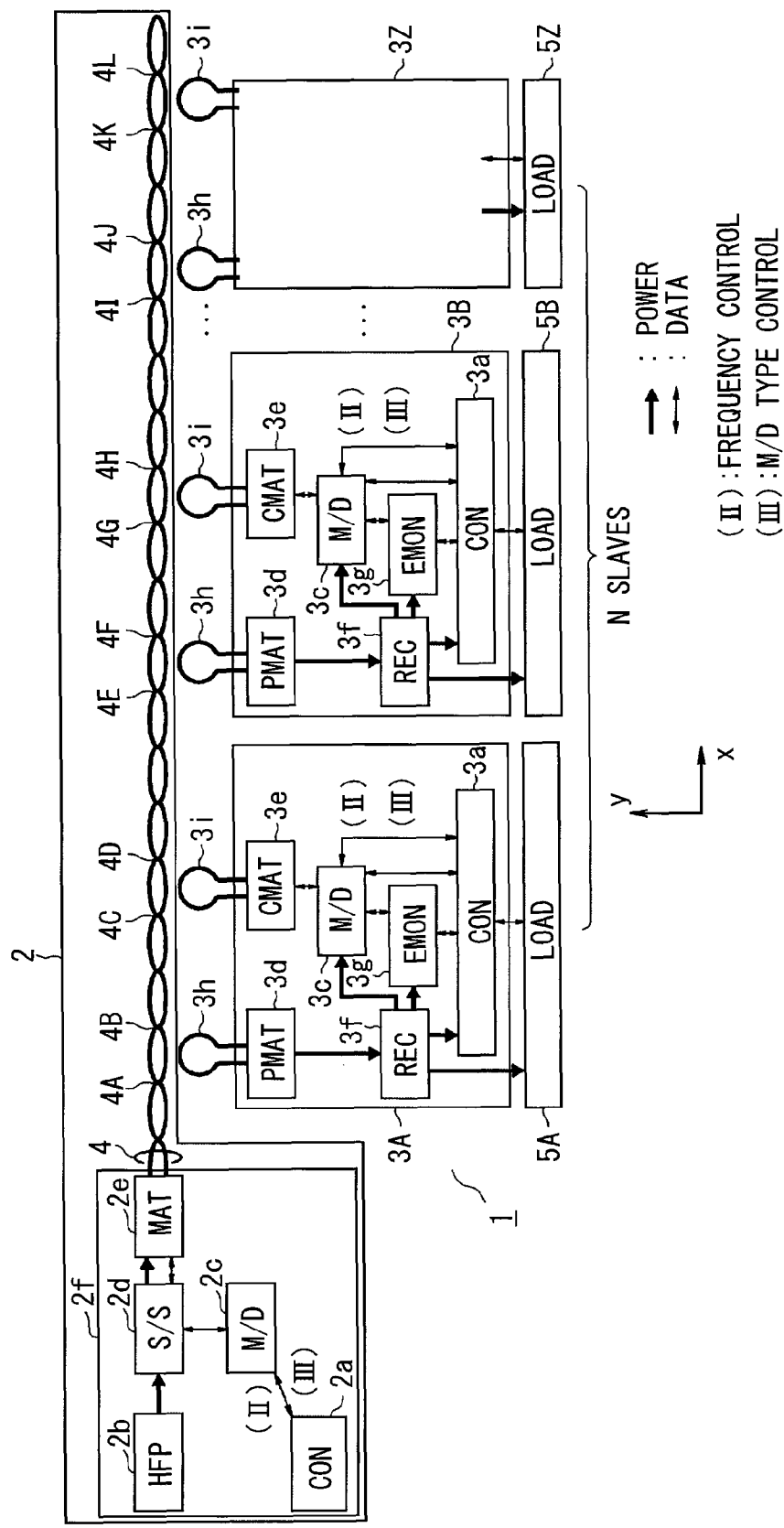
FIGS. 18, 19 are electric block diagrams schematically illustrating a vehicular power line communication system according to a fourth embodiment of the present disclosure.
Figure 19:
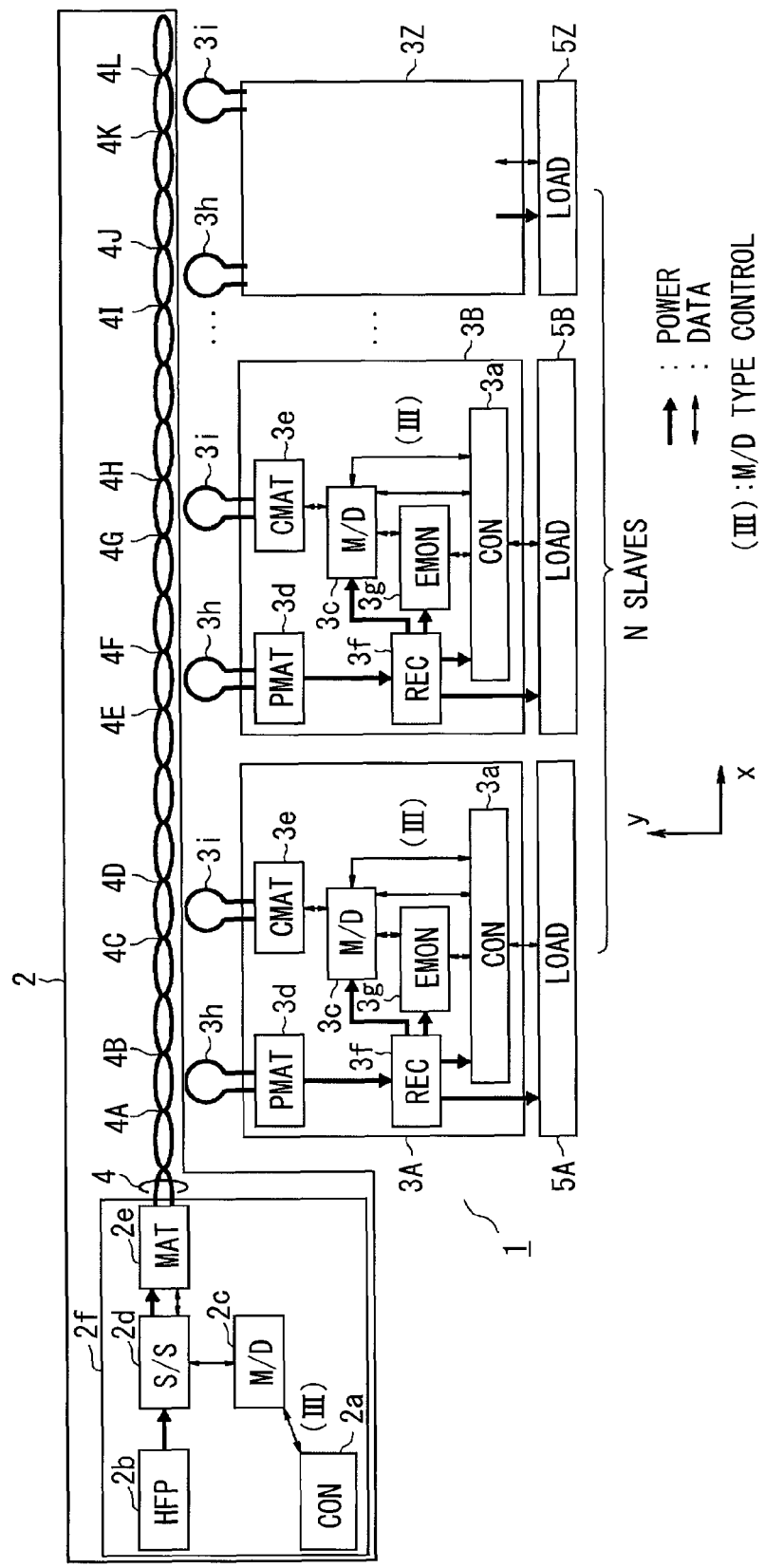

FIG. 18 and FIG. 19 illustrate a fourth embodiment, which has differences from the first embodiment in that while a characteristic of a matching circuit is not made by the control circuit, at least one of the communication frequency control of the modulation and demodulation circuit, and the modulation and demodulation mode control is performed. Portions identical to those in the first embodiment are assigned with the reference signs identical to those in the first embodiment and omitted from the explanation; the different portions are only explained on a priority basis.

The following will explain portions of FIG. 18 different from FIG. 1. The control circuit 2a of the master 2 does not connect a control line to the matching circuit 2e. The control circuit 3a of each slave 3A to 3Z does not connect a control line to the communication matching circuit 3e. The matching circuit 2e of the master 2 contains a fixed capacity capacitor which replaces a variable capacity capacitor 2h of the first embodiment. This configuration permits the matching circuit 2e to match a pair of twisted wires 4 having a loop shape under a predetermined impedance, precluding an impedance adjustment according to control of the control circuit 2a.

Similarly in the slave 3A to 3Z, the communication matching circuit 3e is equipped with a fixed capacity capacitor which replaces the variable capacity capacitor 3k of the first embodiment. Therefore, the communication matching circuit 3e matches with the aperture antenna 3i under a predetermined impedance, precluding an impedance adjustment according to control of the control circuit 3a. The present embodiment does not perform a characteristic control of the matching circuit 2e and the communication matching circuit 3e whereas performing a communication frequency control of the modulation and demodulation circuits 2c and 3c and a modulation and demodulation type control.

The process of the communication frequency adjustment mode illustrated in FIG. 7 and FIG. 8 does not perform a characteristic control of the matching circuit 2e and the communication matching circuit 3e. That is, the master 2 only performs a change control of the communication frequency at S6 in FIG. 7, whereas the slaves 3A to 3Z performs a communication frequency control by replacing T6 in FIG. 8. The process in the modulation and demodulation type adjustment mode in FIG. 9 and FIG. 10 is performed as explained in the first embodiment except the matching processes at V3, V4, V8, V9, V14, and V15. The favorable communication may be made between the master 2 and the slaves 3A to 3Z like the first embodiment. In addition, the above configuration does not need a control line between the control circuit 2a and the matching circuit 2e and a control line between the control circuit 3a and the communication matching circuit 3e, as compared with the first embodiment, simplifying the circuit.

Further, as illustrated in FIG. 19, although the modulation and demodulation type control of the modulation and demodulation circuits 2c and 3c are performed, whereas the communication frequency control may not be performed. On the contrary, although the communication frequency control of the modulation and demodulation circuits 2c and 3c may be performed, whereas the modulation and demodulation type control may not be performed. Even such a configuration performs at least one of the modulation and demodulation type control and the communication frequency control of the modulation and demodulation circuits 2c and 3c, providing an effect similar to that of the first embodiment. Further, the number of control lines may be lessened, simplifying the circuit.

Fifth Embodiment

Figure 20:
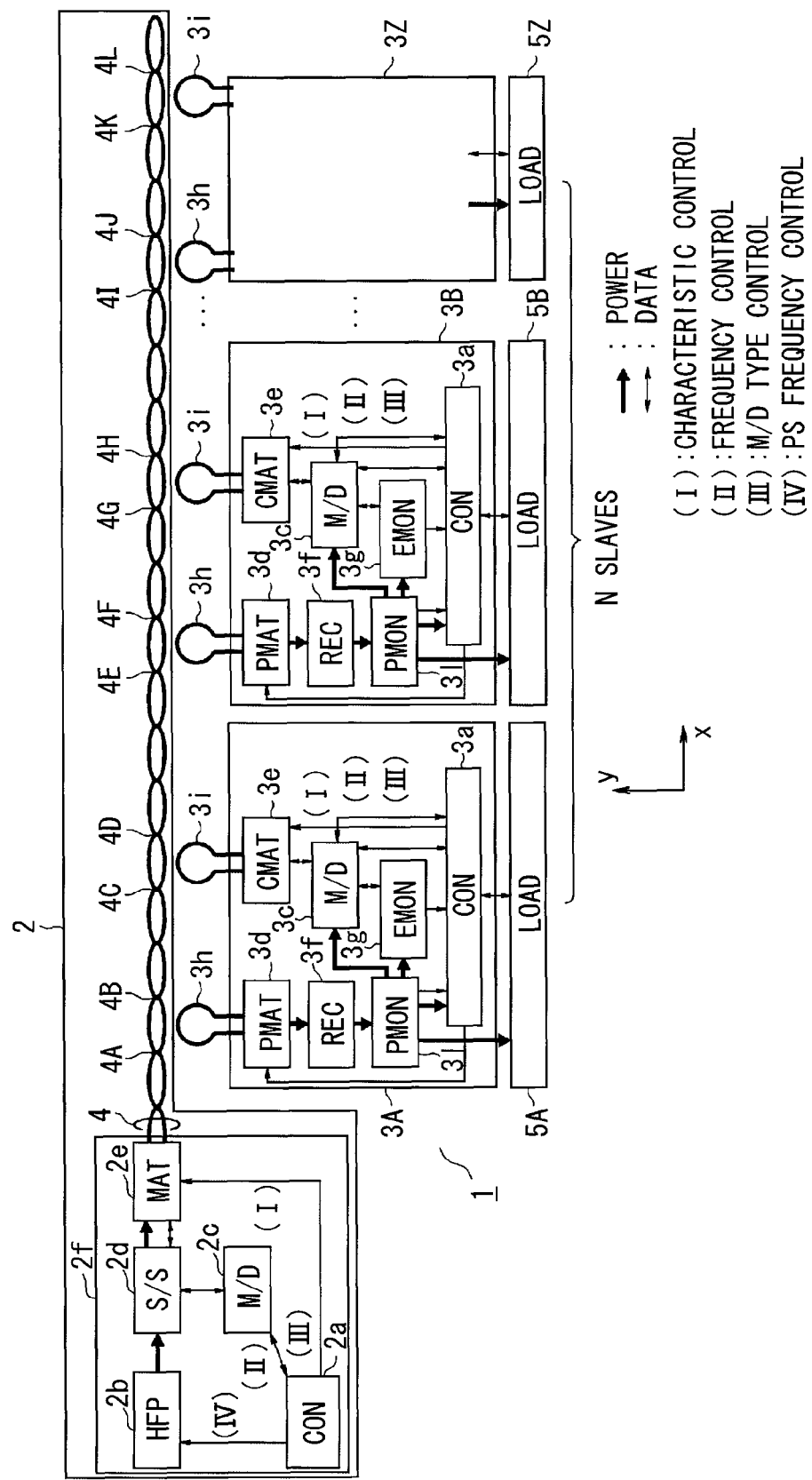
FIG. 20 is an electric block diagram schematically illustrating a vehicular power line communication system according to a fifth embodiment of the present disclosure.

FIG. 20 illustrates a fifth embodiment, which has differences from the first embodiment in that the master 2 controls a power-supply frequency of the high-frequency power generation circuit (high-frequency power generation portion), whereas the slave includes a power-source monitor circuit (power-source monitor portion) of the electric power due to the power-supply frequency to perform a feedback of the power-supply frequency control. Portions identical to those in the first embodiment are assigned with the reference signs identical to those in the first embodiment and omitted from the explanation; the different portions are only explained on a priority basis.

The following will explain portions of FIG. 20 different from FIG. 1. The control circuit (power-supply frequency control portion) 2a of the master 2 is connected with the high-frequency power generation circuit 2b via a control line, thereby controlling the power-supply frequency of the carrier signal (high-frequency signal: power signal) which the high-frequency power generation circuit 2b generates.

The carrier signal of the high-frequency power generation circuit 2b is superimposed on the twisted wires 4; the power-supply matching circuit 3d receives the carrier signal via the aperture antenna 3h and outputs the power signal to the rectification circuit 3f. The rectification circuit 3f rectifies the carrier signal, and outputs it to the power-source monitor circuit 3l.

The power-source monitor circuit 3l supplies the electric power, which is rectified and smoothed by the rectification circuit 3f, to the modulation and demodulation circuit 3c, the error rate monitor circuit 3g, the control circuit 3a, and the load 5A. In addition, the power source monitor circuit 3l measures a receiving field intensity level of the carrier signal, and outputs this measurement result to the control circuit 3a. The control circuit 3a determines whether the receiving field intensity level of the carrier signal is equal to or greater than a predetermined level, and performs the matching process of the power-supply matching circuit 3d when it is determined that the receiving field intensity level is less than the predetermined level. Even when the control circuit 3a of the slave 3A to 3Z performs the matching process of the power-supply matching circuit 3d equal to or greater than the predetermined number of times, the receiving field intensity level may not become equal to or greater than a predetermined level. In such a case, the control circuit 3a of the slave 3A to 3Z requests the master 2 to change the power-supply frequency.

When receiving the request of changing the power-supply frequency, the master 2 controls to change the power-supply frequency of the control circuit 2a. Thus, the master's changing of the power-supply frequency permits the communication between the master 2 and the slaves 3A to 3Z certainly. The matching process of the power-supply frequency of the matching circuit 3d may be performed as needed.

The high quality communication processing may be achieved by subsequently performing the communication frequency adjustment mode and the modulation and demodulation type adjustment mode explained in the first embodiment. The present embodiment may achieve a high quality communication process while improve a power supply efficiency.

Sixth Embodiment

Figure 21:
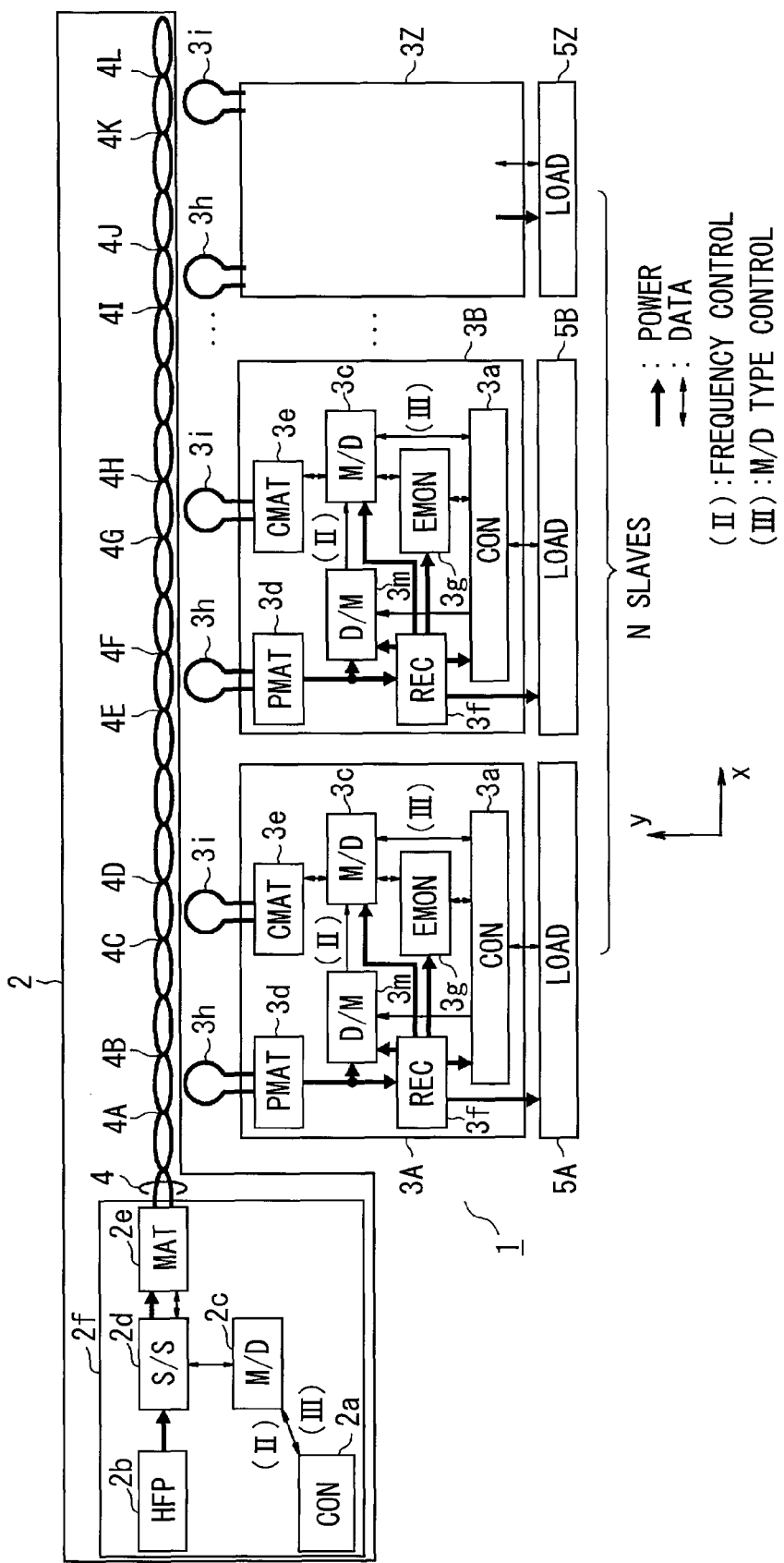
FIG. 21 is an electric block diagram schematically illustrating a vehicular power line communication system according to a sixth embodiment of the present disclosure.

FIG. 21 illustrates a sixth embodiment, which has differences from the first embodiment in that the slaves 3A to 3Z receives a high-frequency power with a frequency from the high-frequency power generation circuit of the master 2 and controls a communication frequency of the modulation and demodulation circuit. Portions identical to those in the first embodiment are assigned with the reference signs identical to those in the first embodiment and omitted from the explanation; the different portions are only explained on a priority basis.

As illustrated in FIG. 21, the slave 3A to 3Z includes a dividing and multiplying circuit 3m. The dividing and multiplying circuit operates on direct current power which the rectification circuit 3f outputs. The dividing and multiplying circuit 3m is assigned with a division ratio and a multiplying ratio depending on control of the control circuit 3a. The dividing and multiplying circuit 3m receives a power-supply signal via the power-supply matching circuit 3d, and applies dividing or multiplying to the frequency of the power-supply signal to output to the modulation and demodulation circuit 3c as a communication-use carrier.

The modulation and demodulation circuit 3c of the slave 3A to 3Z uses the received communication-use carrier as a communication frequency for the modulation and demodulation. The modulation and demodulation circuit 3c of the slave 3A to 3Z uses the received communication-use carrier as a communication frequency for the modulation and demodulation. This facilitates the synchronization between the master 2 and the slave 3A to 3Z. In the first embodiment, the slave 3A to 3Z controls a communication frequency using a high quality frequency oscillation circuit using a crystal oscillator etc. In contrast, the present embodiment need not use such a crystal oscillator etc., thereby simplifying the circuit.

Seventh Embodiment

Figure 22:
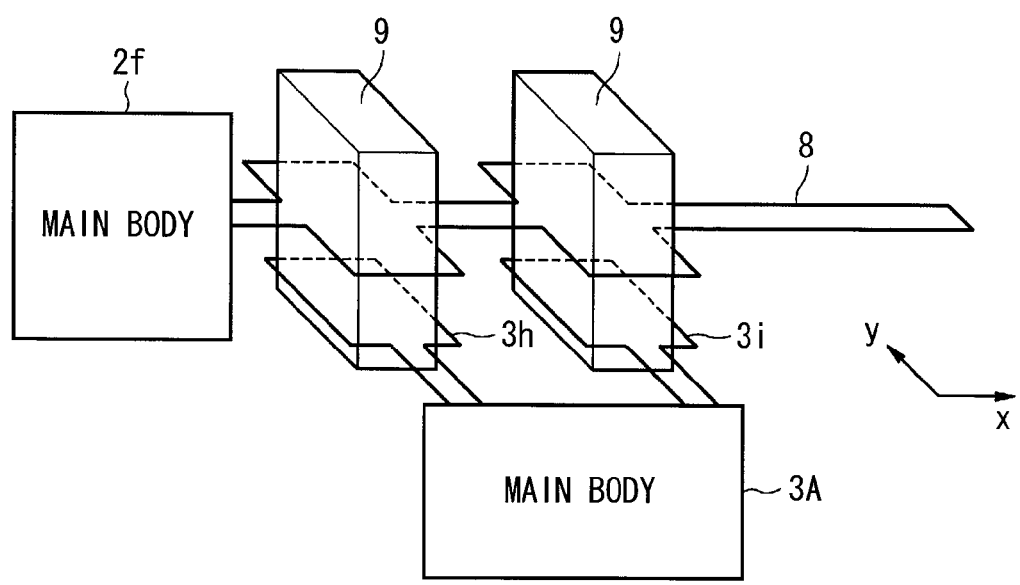
FIG. 22 is a diagram illustrating an electromagnetic induction connection between a master and a slave according to a seventh embodiment of the present disclosure.

FIG. 22 illustrates a seventh embodiment, which has differences from the first embodiment in that (i) a loop coil is used while a pair of twisted wires whose ends are connected is not used and (ii) a master-side opening area of the loop coil facing a slave-side opening area of an aperture antenna is larger than another master-side opening area. Portions identical to those in the first embodiment are assigned with the reference signs identical to those in the first embodiment and omitted from the explanation; the different portions are only explained on a priority basis.

FIG. 22 illustrates a configuration example of an antenna portion of the seventh embodiment. The loop coil 8 is composed of two core wires that are connected at their one ends to have a loop shape as being extended linearly from the main body 2f of the master 2 in a predetermined direction (x direction). In other words, the loop coil 8 is provided to have no twisted portions 4A to 4L of the twisted wires 4 illustrated in FIG. 1. This loop coil 8 has two mater-side opening areas facing the aperture antennas 3h, 3i for reception or slave 3A, respectively; the opening area is in between two core wires and has a longer distance in y direction than other opening areas or gaps in between two core wires.

The main body 2f of the master 2 transmits electric power and signals by superimposing high-frequency signals to the loop coil 8. The loop coil 8 generates an electromagnetic field in response to the applied current. The slave 3A to 3Z (3B to 3Z are not shown in FIG. 22) performs an electromagnetic induction connection in the electromagnetic field generated in the loop coil 8 using the loop-shaped aperture antennas 3h and 3i, thereby receiving signals (electric power and data modulation signals).

As explained above, the loop coil 8 has the master-side opening areas facing the reception-use aperture antennas 3h, 3i as gaps in between two core wires; each master-side opening area has a longer distance in a lateral direction (i.e., y direction) than other gaps in between two core wires; thus, the electromagnetic induction connection may be strengthened. In addition, as illustrated in FIG. 22, cores 9 such as ferrite may be provided between the master-side opening areas of the loop coil 8 and the aperture antennas 3h, 3i as needed.

The seventh embodiment provides the loop coil 8 composed of two core wires, which are extended from a main body of the master 2 and have far ends being connected to each other, for performing a power line communication. The loop coil 8 includes a master-side opening area as a gap in between the two core wires facing an aperture antenna; the master-side opening area is larger than other gaps in between the two core wires. This configuration strengthens an electromagnetic induction connection between the master 2 and the slave 3A to 3Z like the first embodiment.

Modifications

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

For example, in any one of the first to sixth embodiments, the core 9 explained in FIG. 22 or the seventh embodiment may be provided similarly to pass through both (i) a master-side opening area of the twisted wires 4 in between twisted portions 4A to 4B, 4C to 4D, ..., 4K to 4L and (ii) an aperture antenna 3h, 3i.

The first embodiment performs two adjustment modes of the communication frequency adjustment mode and the modulation and demodulation type adjustment mode. Without need to be limited thereto, only one of the two adjustment modes may be performed.

What is claimed is:
1. A vehicular power line communication system (PLC) comprising:
   a master including a pair of twisted wires, whose ends are connected to form a loop shape, the pair of twisted wires configured to serve as a power line and a data communication line, the master further including a modulation portion configured to modulate data to prepare a data modulation signal, the master configured to output a high-frequency signal via the pair of twisted wires to transmit an electric power as well as the data modulation signal; and
   a slave including an aperture antenna having a loop shape configured to receive the data modulation signal via the pair of twisted wires using an electromagnetic induction connection with an electromagnetic field generated in the pair of twisted wires according to an energization current of the pair of twisted wires, the aperture antenna having a slave-side opening area that faces a master-side opening area provided in between twisted portions in the pair of twisted wires, the slave further including a demodulation portion configured to demodulate the data modulation signal received via the aperture antenna to obtain a demodulated data, the slave further including an error rate monitor portion configured to monitor an error rate of the demodulated data obtained by the demodulation portion, wherein the master further includes a high-frequency power generation portion and a power-supply frequency control portion, the high-frequency power generation portion is configured to generate a high-frequency power for power supply, the slave further includes a power source monitor portion, which is configured to monitor, via the pair of twisted wires, the high-frequency power generated by the high-frequency power generation portion, the power-supply frequency control portion is configured to control a frequency of the high-frequency power to be generated by the high-frequency power generation portion based on the high-frequency power monitored by the power source monitor portion, the pair of twisted wires having the loop shape is provided as a loop coil without a plurality of twisted portions, and the loop coil includes the master-side opening area facing the slave-side opening area of the aperture antenna as an aperture-faced gap in between the pair of twisted wires of the loop coil, the aperture-faced gap is larger than another gap in between the pair of twisted wires of the loop coil.

2. The vehicular PLC system according to claim 1, wherein the pair of twisted wires includes a plurality of twisted portions to form a plurality of master-side opening areas provided in between the plurality of twisted portions, and the master-side opening area facing the slave-side opening area is larger than another master-side opening area among the plurality of master-side opening areas.

3. The vehicular PLC system according to claim 1, wherein the master further includes a modulation frequency control portion configured to control a communication frequency of the data modulation signal of the modulation portion, and the slave further includes a communication frequency control portion configured to control a communication frequency of a reply signal which the slave replies to the master.

4. The vehicular PLC system according to claim 1, wherein the master further includes a modulation and demodulation type control portion, configured to control a modulation type of the data modulation signal and configured to control a demodulation type of a reply signal which the slave replies to the master, and the slave further includes a modulation and demodulation type control portion configured to control a demodulation type of the data modulation signal of the master and configured to control a modulation type of the reply signal which the slave replies to the master.

5. The vehicular PLC system according to claim 1, wherein the master and the slave further includes a matching portion configured to adjust an impedance of the aperture antenna.

6. The vehicular PLC system according to claim 5, wherein the slave is configured to repeat meats a matching of the aperture antenna less than a predetermined number of matching times the matching portion performs.

7. The vehicular PLC system according to claim 1, wherein the slave is configured to receive a reception signal via the pair of twisted wires, the reception signal being the high-frequency power generated by the high-frequency power generation portion, and the slave is configured to use the reception signal for controlling a carrier communication frequency which the demodulation portion demodulates.

8. The vehicular PLC system according to claim 1, wherein the master and the slave includes a matching portion configured to adjust an impedance of the aperture antenna, the master is configured to output the data modulation signal prepared with modulation by the modulation portion in a predetermined modulation and demodulation type, the slave is configured to demodulate the data modulation signal, which is outputted by the master, in a predetermined modulation and demodulation type using the demodulation portion to obtain the demodulated data, the slave is configured to monitor the error rate of the demodulated data using the error rate monitor portion, and the slave is configured to perform the matching using the matching portion on a condition that the error rate exceeds a first predetermined level.

9. The vehicular PLC system according to claim 1, wherein the master further includes a modulation frequency control portion configured to control a communication frequency of the data modulation signal of the modulation portion, the master is configured to output the data modulation signal modulated by the modulation portion in a predetermined modulation and demodulation type, the slave is configured to demodulate the data modulation signal, which is outputted by the master, in a predetermined modulation and demodulation type using the demodulation portion, the slave is configured to monitor the error rate of the demodulated data using the error rate monitor portion, and the master is configured to change a communication frequency of the data modulation signal using the modulation frequency control portion on a condition that the error rate exceeds a first predetermined level.

10. The vehicular PLC system according to claim 1, wherein the master further includes a modulation and demodulation type control portion, configured to control a modulation type of the data modulation signal and controls a demodulation type of a reply signal which the slave replies to the master, the slave further includes a modulation and demodulation type control portion, configured to control a demodulation type of the data modulation signal of the master and controls a modulation type of the reply signal which the slave replies to the master, the master is configured to output the data modulation signal prepared by modulation by the modulation portion in a first modulation and demodulation type, the slave is configured to demodulate the data modulation signal, which is outputted by the master, in a first modulation and demodulation type using the demodulation portion, the slave is configured to monitor the error rate of the demodulated data using the error rate monitor portion, and the master and the slave are configured to change the first modulation and demodulation type into a second modulation and demodulation type in the modulation and demodulation type control portion of the master and the modulation and demodulation type control portion of the slave, respectively, on a condition that the error rate monitored by the error rate monitor portion becomes less than a second predetermined level, the second modulation and demodulation type having a number of assignment data per one symbol larger than the first modulation and demodulation type has.

11. The vehicular PLC system according to claim 10, wherein after the slave demodulates a data modulation signal, which is outputted by the master, in the second modulation and demodulation type using the demodulation portion, the slave is configured to monitor an error rate of the demodulated data using the error rate monitor portion, and the master and the slave are configured to change the second modulation and demodulation type into a third modulation and demodulation type in the modulation and demodulation type control portion of the master and the modulation and demodulation type control portion of the slave, respectively, on a condition that the error rate monitored by the error rate monitor portion becomes equal to or greater than the second predetermined level, the third modulation and demodulation type having a number of assignment data per one symbol smaller than the second modulation and demodulation type has.

* * * * *